United States Patent
Datema et al.

(10) Patent No.: US 12,179,384 B2
(45) Date of Patent: *Dec. 31, 2024

(54) ADDITIVE SYSTEM FOR A CONCRETE MIXER TRUCK

(71) Applicant: Oshkosh Corporation, Oshkosh, WI (US)

(72) Inventors: Bryan S. Datema, Rochester, MN (US); Jacob Holst, Oshkosh, WI (US); Andrew Setter, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,781

(22) Filed: Oct. 2, 2023

(65) Prior Publication Data

US 2024/0025079 A1     Jan. 25, 2024

Related U.S. Application Data

(63) Continuation of application No. 17/155,659, filed on Jan. 22, 2021, now Pat. No. 11,813,770.

(60) Provisional application No. 62/986,472, filed on Mar. 6, 2020, provisional application No. 62/965,357, filed on Jan. 24, 2020.

(51) Int. Cl.
    *B28C 5/42*         (2006.01)
    *B60P 3/16*         (2006.01)

(52) U.S. Cl.
    CPC .......... *B28C 5/4272* (2013.01); *B28C 5/4213* (2013.01); *B28C 5/422* (2013.01); *B28C 5/4268* (2013.01); *B60P 3/16* (2013.01)

(58) Field of Classification Search
CPC ..... B28C 5/4272; B28C 5/4213; B28C 5/422; B28C 5/4268; B28C 7/0418; B60P 3/16
See application file for complete search history.

(56) References Cited

U.S. PATENT DOCUMENTS

| | | | | |
|---|---|---|---|---|
| 4,789,244 | A | * 12/1988 | Dunton | B01F 23/291 366/101 |
| 5,653,533 | A | * 8/1997 | Green | B28C 7/0418 366/182.1 |
| 7,578,379 | B2 | 8/2009 | Gillmore et al. | |
| 7,648,015 | B2 | 1/2010 | Gillmore et al. | |
| 7,931,397 | B2 | 4/2011 | Lindblom et al. | |

(Continued)

*Primary Examiner* — Charles Cooley
(74) *Attorney, Agent, or Firm* — Foley & Lardner LLP

(57) ABSTRACT

A concrete mixer vehicle includes a mixer drum, an additive admixture system, and a controller. The additive admixture system includes an air inlet valve, a fluid valve, an air valve, and a pump. The controller is configured to operate the additive admixture system to transition the additive admixture system between an additive addition mode, a drain mode, and a system clear mode. The controller transitions the additive admixture system into the additive addition mode and operates the pump until a desired amount of an additive is added to the mixer drum, transitions the additive admixture system into the drain mode for a predetermined amount of time in response to the desired amount of additive being added to the mixer drum, and transitions the additive admixture system into the system clear mode for a predetermined amount of time to clear stagnant fluid or built up mixture from the additive admixture system.

20 Claims, 17 Drawing Sheets

(56) References Cited

U.S. PATENT DOCUMENTS

| | | | |
|---|---|---|---|
| 8,287,173 | B2 | 10/2012 | Khouri |
| 8,613,543 | B2 | 12/2013 | Lindblom et al. |
| 8,646,965 | B2 | 2/2014 | Datema et al. |
| 8,989,905 | B2 * | 3/2015 | Sostaric ............... B28B 23/0031 700/265 |
| D737,866 | S | 9/2015 | Datema et al. |
| D772,306 | S | 11/2016 | Datema et al. |
| 9,694,671 | B2 | 7/2017 | Wildgrube et al. |
| 10,239,403 | B2 | 3/2019 | Broker et al. |
| 10,414,067 | B2 | 9/2019 | Datema et al. |
| 10,792,613 | B1 | 10/2020 | Drake et al. |
| 10,843,379 | B2 | 11/2020 | Rocholl et al. |
| 10,901,409 | B2 | 1/2021 | Datema et al. |
| 10,940,610 | B2 | 3/2021 | Clifton et al. |
| 10,987,829 | B2 | 4/2021 | Datema et al. |
| 11,813,770 | B2 * | 11/2023 | Datema ................. B28C 5/4272 |
| 11,926,291 | B2 * | 3/2024 | Beck, III ................. B28C 7/00 |
| 2007/0185636 | A1 * | 8/2007 | Cooley ................... B28C 7/12 701/50 |
| 2008/0316856 | A1 * | 12/2008 | Cooley ................. B28C 5/4231 366/142 |
| 2009/0037026 | A1 * | 2/2009 | Sostaric ............. B28B 23/0031 700/265 |
| 2010/0246312 | A1 * | 9/2010 | Welker .................. B28C 5/003 366/4 |
| 2018/0250847 | A1 * | 9/2018 | Wurtz .................... B28C 5/422 |
| 2019/0217698 | A1 | 7/2019 | Broker et al. |
| 2019/0344475 | A1 | 11/2019 | Datema et al. |
| 2020/0094671 | A1 | 3/2020 | Wildgrube et al. |
| 2020/0230842 | A1 * | 7/2020 | Datema .................... G01P 3/44 |
| 2021/0031649 | A1 * | 2/2021 | Messina ............... B28C 5/4265 |
| 2021/0039719 | A1 * | 2/2021 | Datema ................. B62D 25/18 |
| 2021/0069934 | A1 | 3/2021 | Rocholl et al. |
| 2021/0107179 | A1 * | 4/2021 | Glunz ................... B28C 5/4272 |
| 2021/0124347 | A1 | 4/2021 | Datema et al. |
| 2021/0229321 | A1 * | 7/2021 | Datema ................. B28C 5/4272 |
| 2022/0388198 | A1 * | 12/2022 | Datema ................. B28C 7/0418 |
| 2024/0025079 | A1 * | 1/2024 | Datema ................. B28C 5/4213 |

* cited by examiner

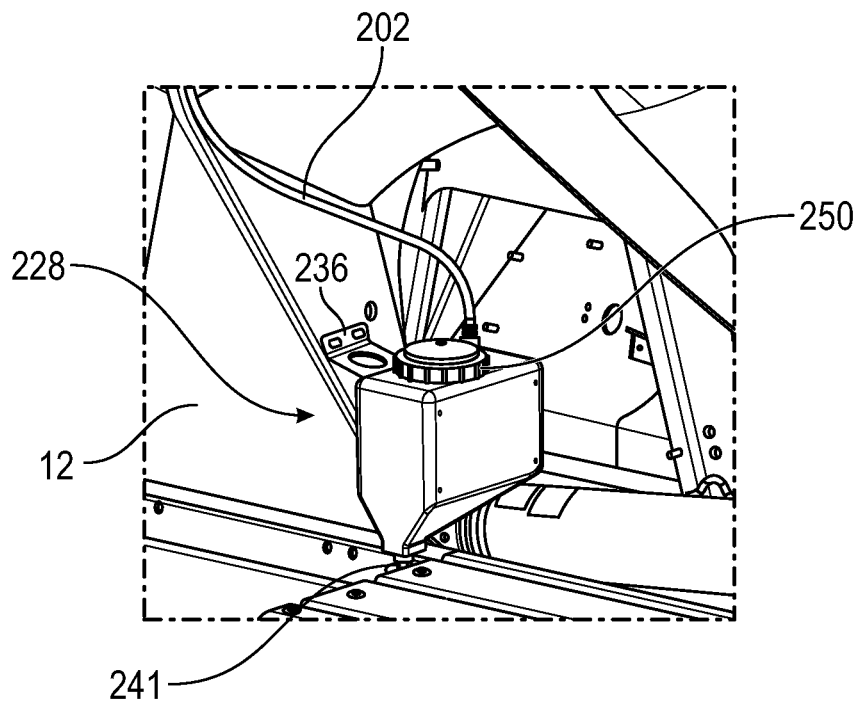
FIG. 17
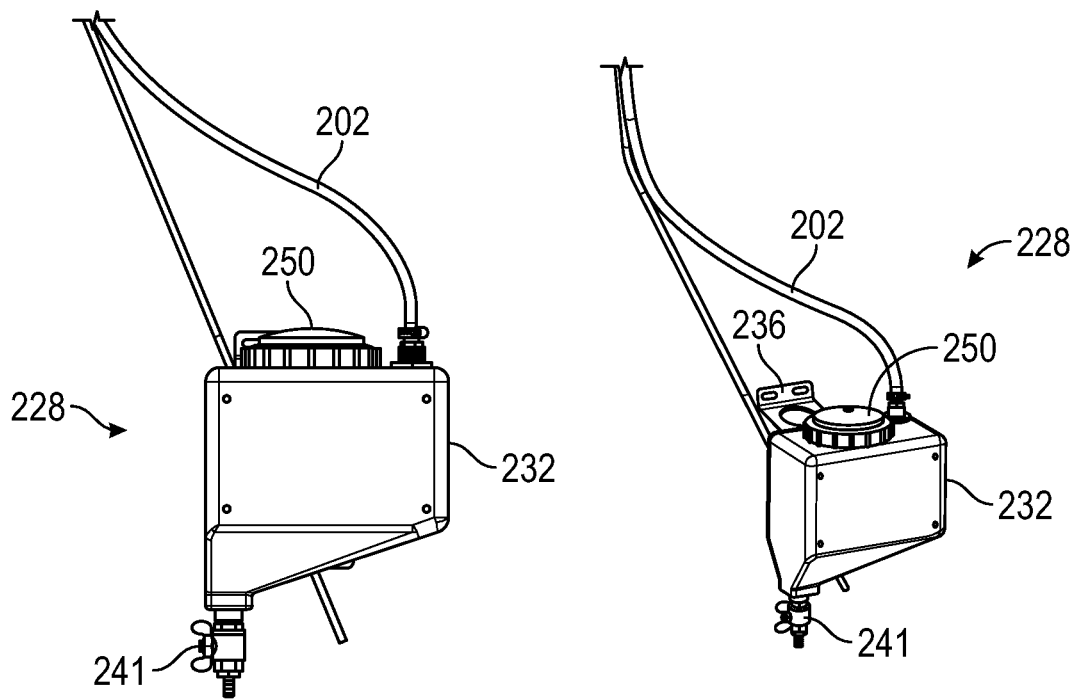
FIG. 18  FIG. 19

ADDITIVE SYSTEM FOR A CONCRETE MIXER TRUCK

CROSS-REFERENCE TO RELATED PATENT APPLICATIONS

This application is a continuation of U.S. application Ser. No. 17/155,659, filed Jan. 22, 2021, which claims the benefit of and priority to U.S. Provisional Application No. 62/986,472, filed Mar. 6, 2020, and U.S. Provisional Application No. 62/965,357, filed Jan. 24, 2020, the entire disclosures all of which are incorporated by reference herein.

BACKGROUND

Concrete mixer vehicles are configured to receive, mix, and transport wet concrete or a combination of ingredients that when mixed form wet concrete to a job site. Concrete mixer vehicles include a rotatable mixer drum that mixes the concrete disposed therein.

SUMMARY

One embodiment of the present application relates to a concrete mixer vehicle. The concrete mixer vehicle includes a mixer drum, an additive admixture system, and a controller. The mixer drum includes an inner volume configured to hold a mixture for transportation and placement. The additive admixture system includes an air inlet valve, a fluid valve, an air valve, and a pump. The controller is configured to operate the air inlet valve, the fluid valve, the air valve, and the pump of additive admixture system to transition the additive admixture system between an additive addition mode, a drain mode, and a system clear mode. The controller is configured to transition the additive admixture system into the additive addition mode and operate the pump until a desired amount of an additive is added to the mixer drum. The controller is further configured to transition the additive admixture system into the drain mode for a predetermined amount of time in response to the desired amount of additive being added to the mixer drum. The controller is further configured to transition the additive admixture system into the system clear mode for a predetermined amount of time to clear stagnant fluid or built up mixture from the additive admixture system.

Another embodiment of the present application relates to an additive admixture system for a mixer drum. The additive admixture system includes an air inlet valve, a fluid valve, an air valve, a pump, a controller. The controller is configured to operate the air inlet valve, the fluid valve, the air valve, and the pump of additive admixture system to transition the additive admixture system between an additive addition mode, a drain mode, and a system clear mode. The controller is configured to transition the additive admixture system into the additive addition mode and operate the pump until a desired amount of an additive is added to the mixer drum. The controller is configured to transition the additive admixture system into the drain mode for a predetermined amount of time in response to the desired amount of additive being added to the mixer drum. The controller is configured to transition the additive admixture system into the system clear mode for a predetermined amount of time to clear stagnant fluid or built up mixture from the additive admixture system.

Another embodiment of the present application relates to a concrete mixer vehicle. The concrete mixer vehicle includes a mixer drum, an additive admixture system, and a controller. The mixer drum includes an inner volume configured to hold a mixture for transportation and placement. The additive admixture system includes a fluid valve, an air valve, an air inlet valve, and a pump. The controller is configured to operate the fluid valve, the air valve, the air inlet valve, and the pump of additive admixture system to transition the additive admixture system between an additive addition mode, a drain mode, and a system clear mode. The controller is configured to transition the additive admixture system into the additive addition mode and operate the pump to add an to the mixer drum. The controller is configured to transition the additive admixture system into the drain mode in response to the additive being added to the mixer drum. The controller is configured to transition the additive admixture system into the system clear mode to clear stagnant fluid from the additive admixture system.

BRIEF DESCRIPTION OF THE DRAWINGS

The disclosure will become more fully understood from the following detailed description, taken in conjunction with the accompanying FIGURES, wherein like reference numerals refer to like elements, in which:

FIG. 17 is a perspective view of the tank of FIG. 15, according to an exemplary embodiment;

FIG. 18 is a side view of the tank of FIG. 15, according to an exemplary embodiment;

FIG. 19 is a perspective view of the tank of FIG. 15, according to an exemplary embodiment.

DETAILED DESCRIPTION

Figure 1:
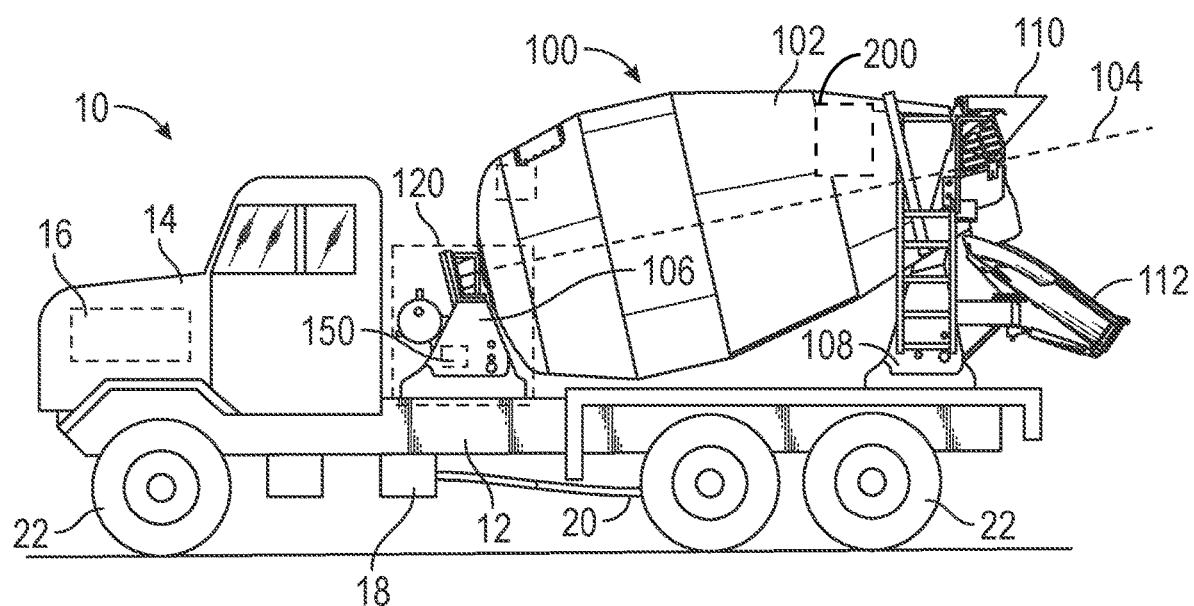
FIG. 1 is a side view of a concrete mixer truck with a drum assembly, a control system, and an additive admixture system, according to an exemplary embodiment.

Before turning to the FIGURES, which illustrate the exemplary embodiments in detail, it should be understood that the present application is not limited to the details or methodology set forth in the description or illustrated in the FIGURES. It should also be understood that the terminology is for the purpose of description only and should not be regarded as limiting.

Referring generally to the FIGURES, a concrete mixer vehicle includes a mixer drum, a frame, a drum drive system, and an additive admixture system, according to an exemplary embodiment. The mixer drum may be rotatably coupled with the frame and is configured to rotate to mix contents such as a mixture, concrete, cement, asphalt, etc. The additive admixture system includes a tank that stores additive for the mixer drum, a compressed air system, a valve, an air valve, an air inlet valve, a pump, a check valve, a flow meter, and an outlet pipe that is configured to discharge additive, fluid, or air into the mixer drum.

The concrete mixer vehicle can also include a control system including a controller that is configured to operate the additive admixture system. The additive admixture system may also include a first inlet line that is fluidly coupled with the valve and the tank so that fluid can be drawn out of the tank through the valve. The additive admixture system may include an intermediate tubular member or line that is fluidly coupled with an outlet of the valve and an outlet of the air valve. The air valve is fluidly coupled at an inlet with a second inlet line. The pump is fluidly coupled downstream of the intermediate line. The air inlet valve is fluidly coupled between an inlet of the pump and the intermediate line. For example, the air inlet valve may be fluidly coupled with the intermediate line. The flow meter is positioned downstream of the pump and is configured to measure an amount of fluid discharged by the pump, a volumetric flow rate of fluid discharged by the pump, a speed of fluid discharged by the pump, a mass flow rate of fluid discharged by the pump, etc. The flow meter is positioned between the pump and the outlet pipe. The check valve may be positioned at the outlet of the pump so that fluid discharged by the pump can pass through the check valve for discharge through the outlet pipe but cannot flow backwards through the check valve. The check valve may alternatively be fluidly coupled anywhere on the additive admixture system between the air inlet valve (e.g., an atmospheric air vent) and the flow meter. For example, the check valve may be fluidly coupled upstream or downstream of the pump but downstream of the air inlet valve and upstream of the flow meter. In other embodiments, the check valve is fluidly coupled anywhere on additive admixture system upstream of the flow meter.

The controller is configured to obtain sensor information from the flow meter and/or a timer and is configured to operate the additive admixture system by controlling or operating the valve, the air valve, the air inlet valve, and/or the pump. The controller may transition the additive admixture system between various modes or configurations by operating the pump and by transitioning the valve, the air valve, or the air inlet valve between their corresponding open positions and their closed positions. In other embodiments, the controller uses a timer and operates based on an amount of time the additive admixture system is transitioned between the various modes, without requiring the flow meter.

The controller may be configured to initially transition the additive admixture system into an additive addition mode by closing the air valve, opening the valve, and closing the air inlet valve. The controller may then operate the pump (e.g., by generating control signals) to draw fluid or additive from the tank so that the fluid passes through the valve, the pump, and the flow meter. The controller may obtain information from the flow meter and monitor an amount of fluid that is added to the mixer drum through the outlet pipe. When a desired amount of additive is added to the mixer drum, the controller may stop the pump from drawing additive or fluid from the tank. The controller may then transition into a fluid drain mode by opening the air inlet valve and maintaining the valve in the open position and the air valve in the closed position. Opening the air inlet valve may allow air to enter the additive admixture system at a position upstream of the pump so that the fluid can fall back into the tank through the valve.

After a predetermined amount of time, the controller may transition the additive admixture system into a clearing mode by closing the valve, opening the air valve, and closing the air inlet valve. The controller may close the air inlet valve before opening the air valve, or may close the valve, open the air valve, and close the air inlet valve simultaneously. The controller may operate the compressed air system so that compressed air is forced through the second inlet line and the air valve, and discharged through the rest of the additive admixture system to clear any remaining fluid in the additive admixture system. In some embodiments, the compressed air system is a compressed air tank that is stored on the concrete mixer vehicle. Opening the air valve may allow the pressurized air to flood the additive admixture system, thereby clearing fluid from the system and discharging the fluid through the outlet pipe into the mixer drum.

The controller may also transition the additive admixture system into the clearing mode to clear concrete, cement, material, debris, etc., that is stored, mixed or processed in the mixer drum and may accumulate or clog in the outlet pipe (e.g., near an outlet aperture). The additive admixture system may transition into the clearing mode so that air is forced through the various tubular members, pipes, conduits, outlet pipe, outlet line, etc., of the additive admixture system to clear any clogged material that may be present in the additive admixture system. The additive admixture system may transition into the clearing mode periodically (e.g., at scheduled, regular, or irregular time intervals), prior to adding admixture to the mixer drum (to ensure that the additive admixture system is cleared), or in response to a user request (e.g., received through a user interface, a human machine interface, a user input device, by pressing a button, etc.). Advantageously, additive admixture system can use compressed or pressurized air in the clearing mode to facilitate clearing clogged material (e.g., cement, concrete, a slurry material, etc.) and forcing the clogged material out of the admixture addition system to ensure that an outlet of the outlet pipe remains clear and so that additive can be added to the mixer drum without being obstructed by clogged cement or concrete.

According to the exemplary embodiment shown in FIGS. 1-5, a vehicle, shown as concrete mixer truck 10, includes a drum assembly, shown as drum assembly 100, a control system, shown as drum control system 150, and an additive admixture system 200. According to an exemplary embodiment, the concrete mixer truck 10 is configured as a rear-discharge concrete mixer truck. In other embodiments, the concrete mixer truck 10 is configured as a front-discharge concrete mixer truck. As shown in FIG. 1, the concrete mixer truck 10 includes a chassis, shown as frame 12, and a cab, shown as cab 14, coupled to the frame 12 (e.g., at a front end thereof, etc.). The drum assembly 100 is coupled to the frame 12 and disposed behind the cab 14 (e.g., at a rear end thereof, etc.), according to the exemplary embodiment shown in FIG. 1. In other embodiments, at least a portion of the drum assembly 100 extends in front of the cab 14. The cab 14 may include various components to facilitate operation of the concrete mixer truck 10 by an operator (e.g., a seat, a steering wheel, hydraulic controls, a user interface, switches, buttons, dials, etc.).

Figure 3:
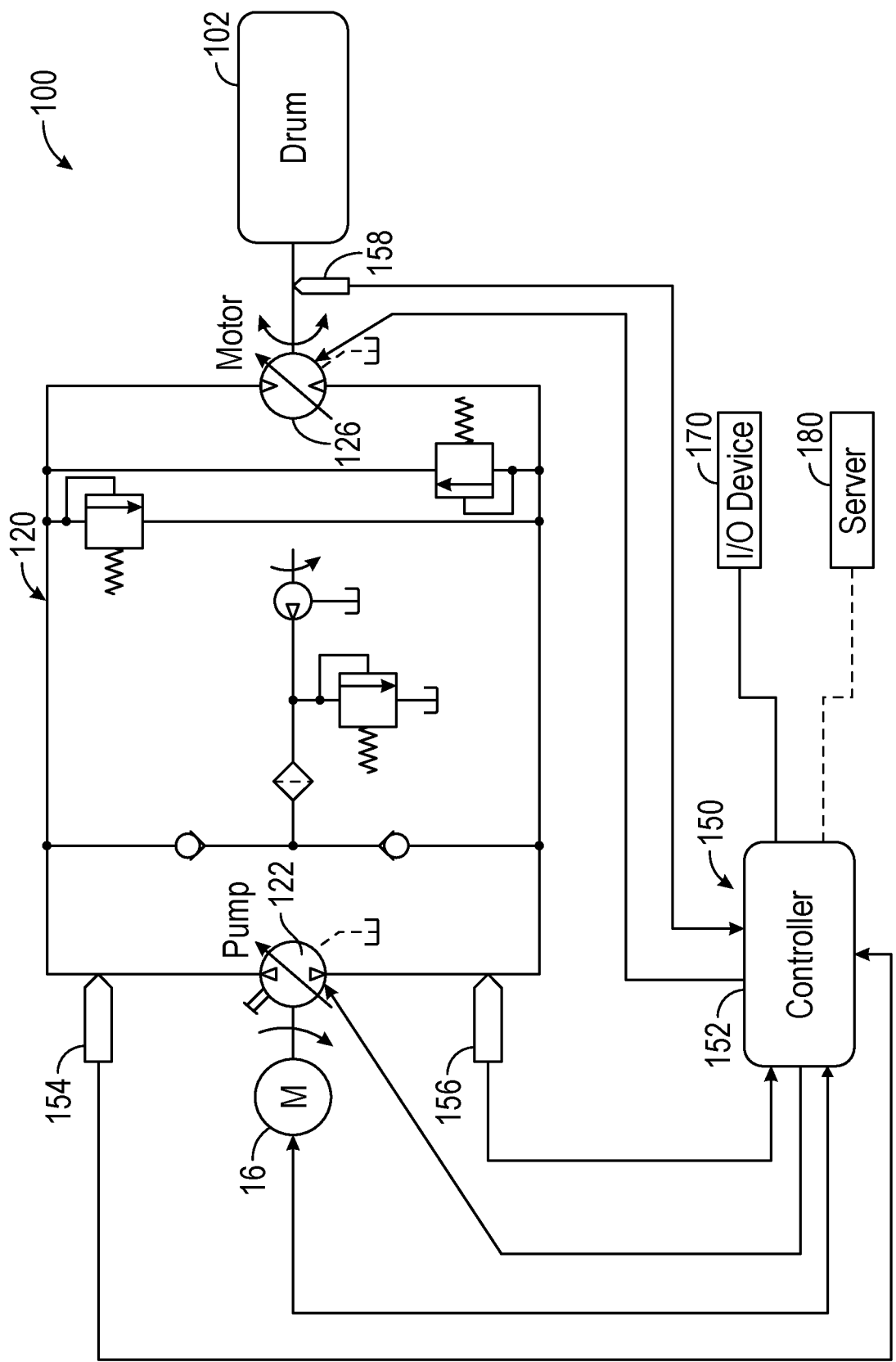
FIG. 3 is a schematic diagram of a drum drive system of the concrete mixer truck of FIG. 1, according to an exemplary embodiment.
Figure 4:
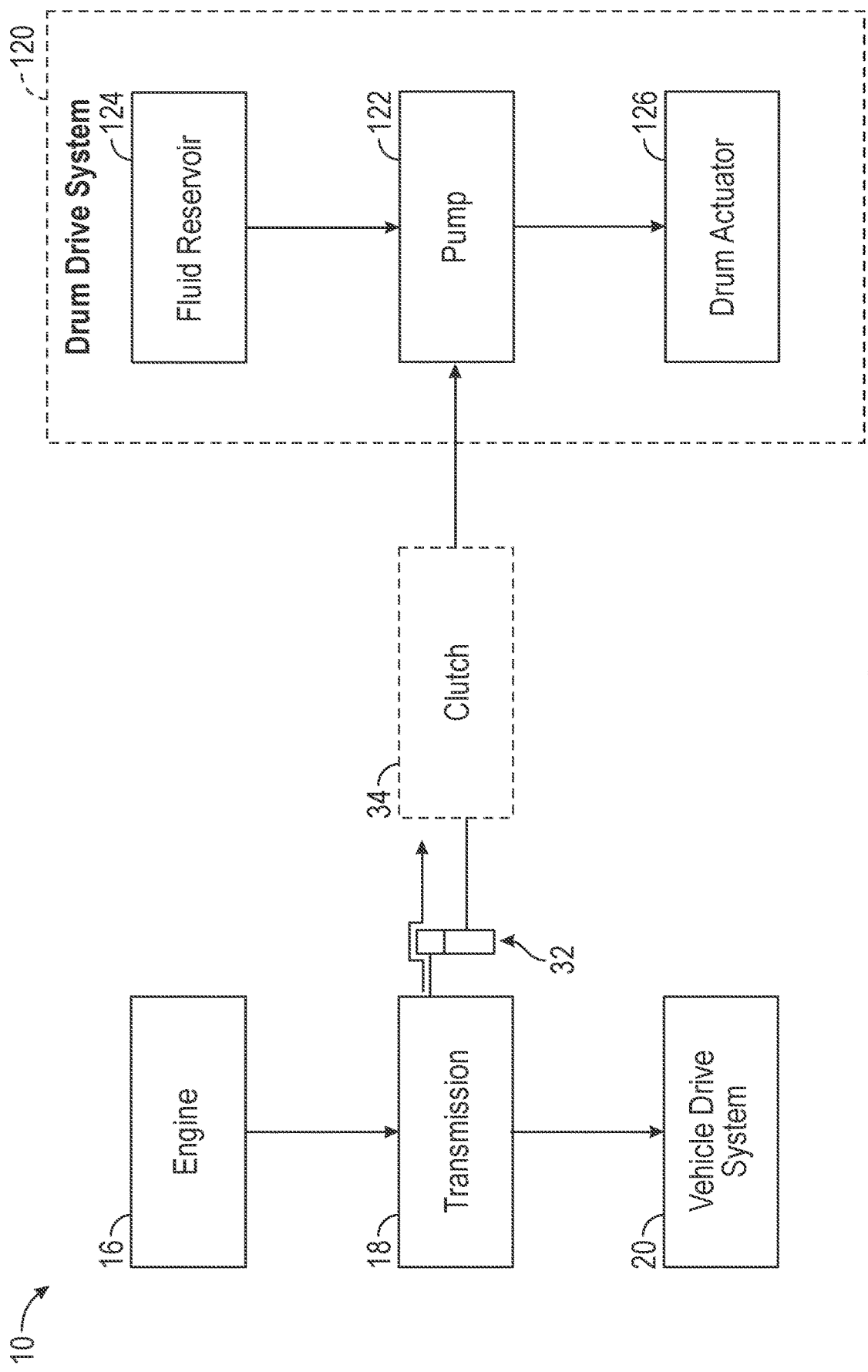
FIG. 4 is a power flow diagram for the concrete mixer truck of FIG. 1 having a drum drive system that is selectively coupled to a transmission with a clutch, according to an exemplary embodiment.
Figure 5:
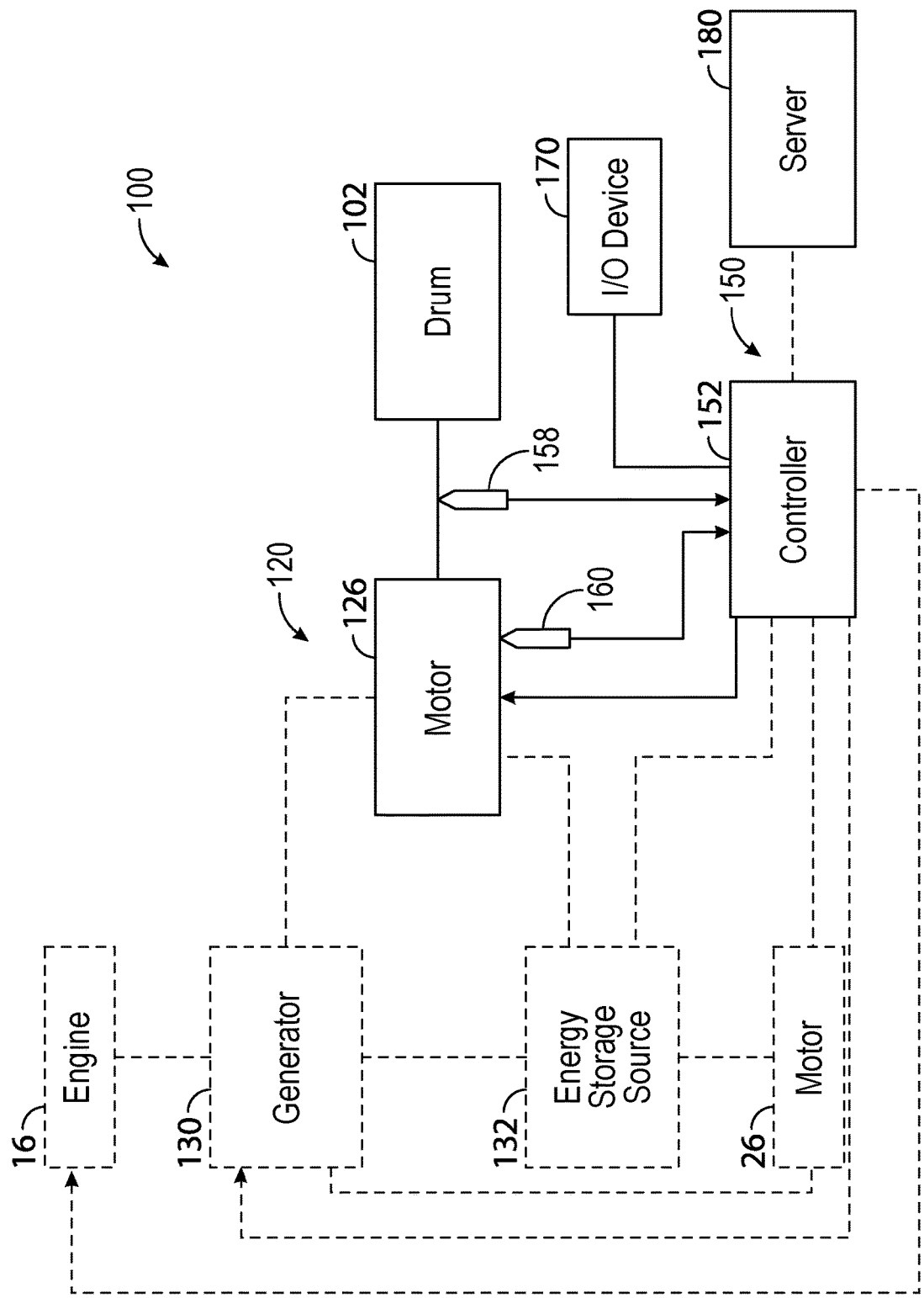
FIG. 5 is a schematic diagram of a drum drive system of the concrete mixer truck of FIG. 1, according to another exemplary embodiment.
Figure 6:
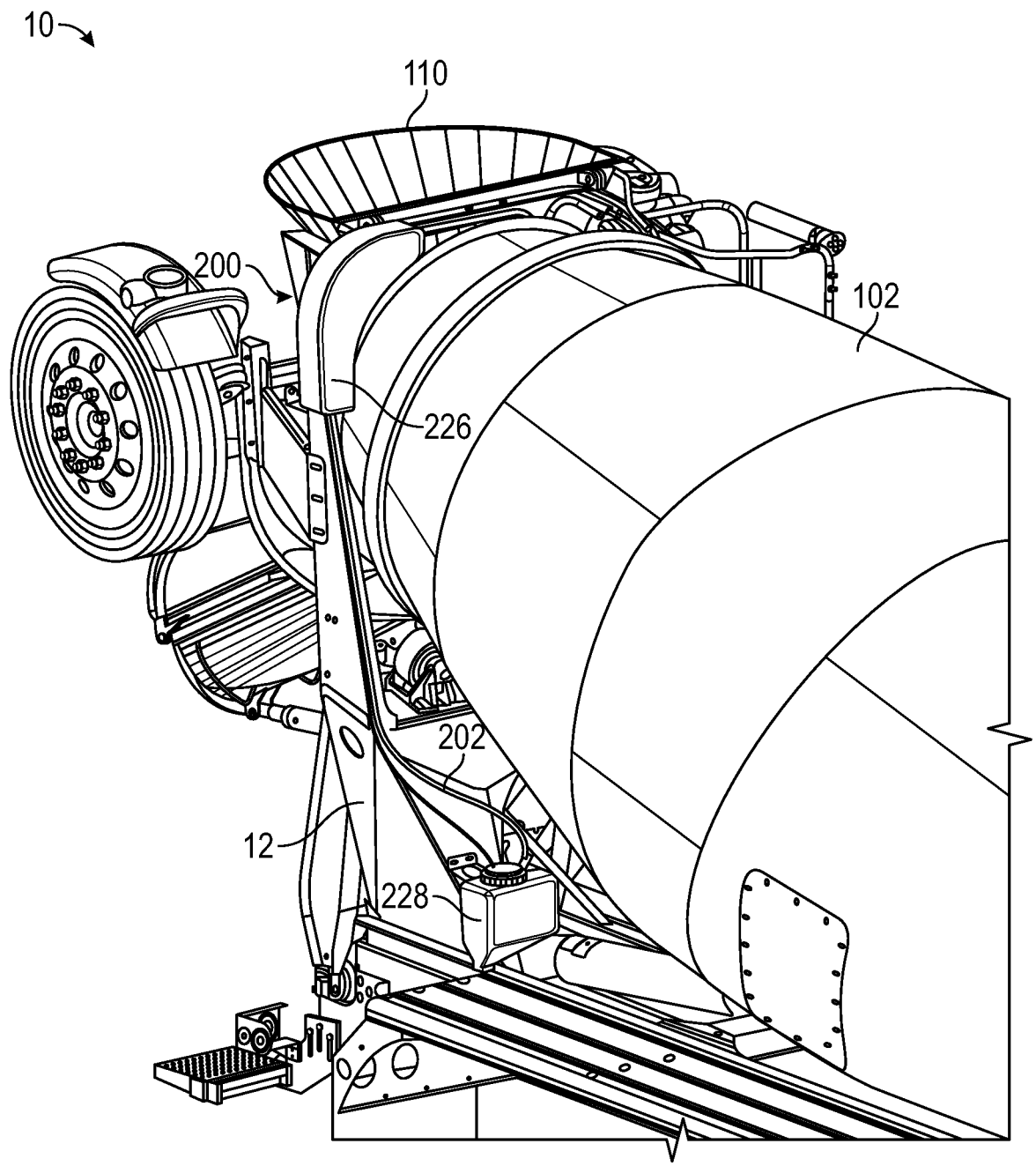
FIG. 6 is a perspective view of a portion of the concrete mixer truck of FIG. 1, showing the additive admixture system in greater detail, according to an exemplary embodiment.
Figure 7:
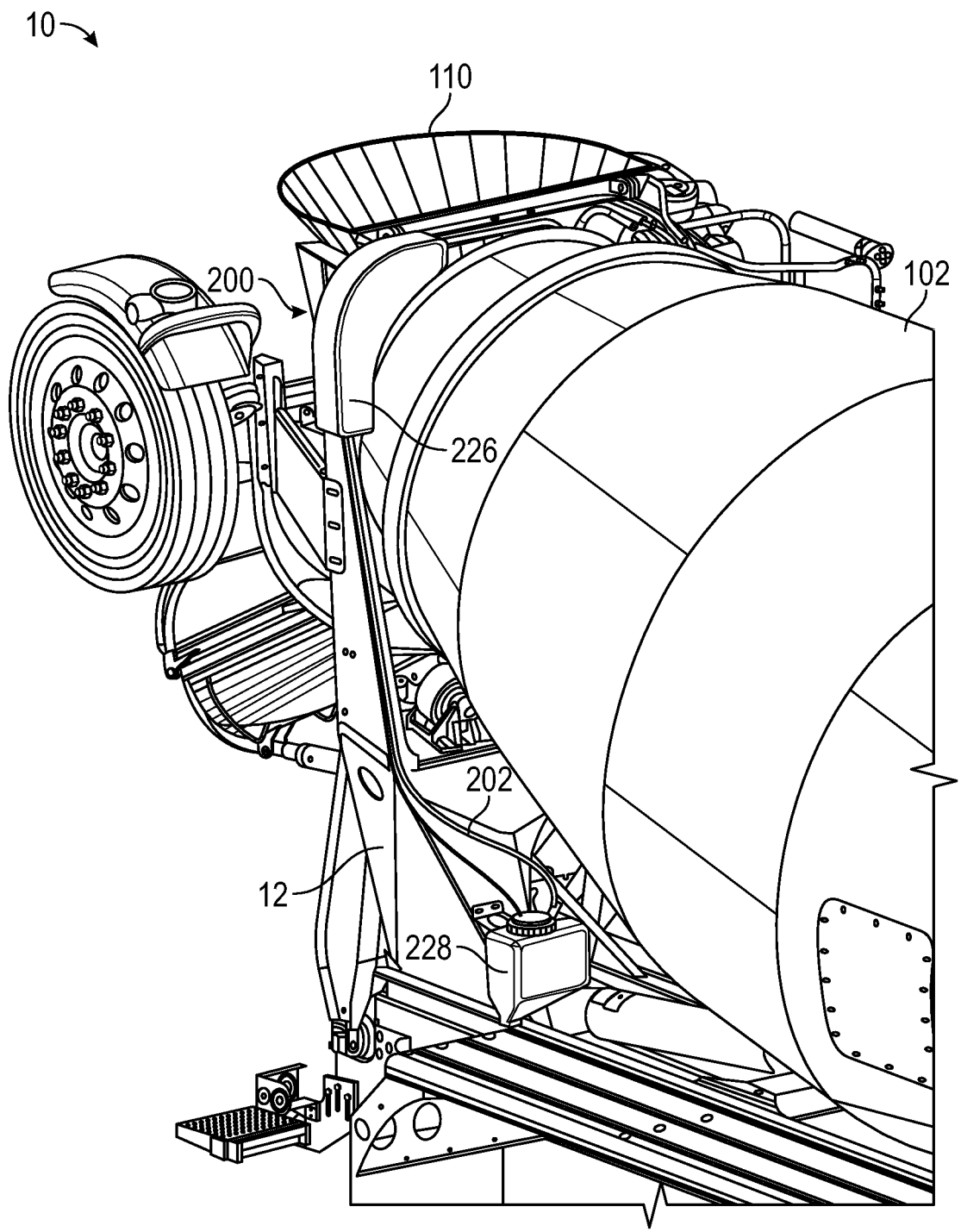
FIG. 7 is a perspective view of a portion of the concrete mixer truck of FIG. 1, showing the additive admixture system in greater detail, according to an exemplary embodiment.
Figure 8:
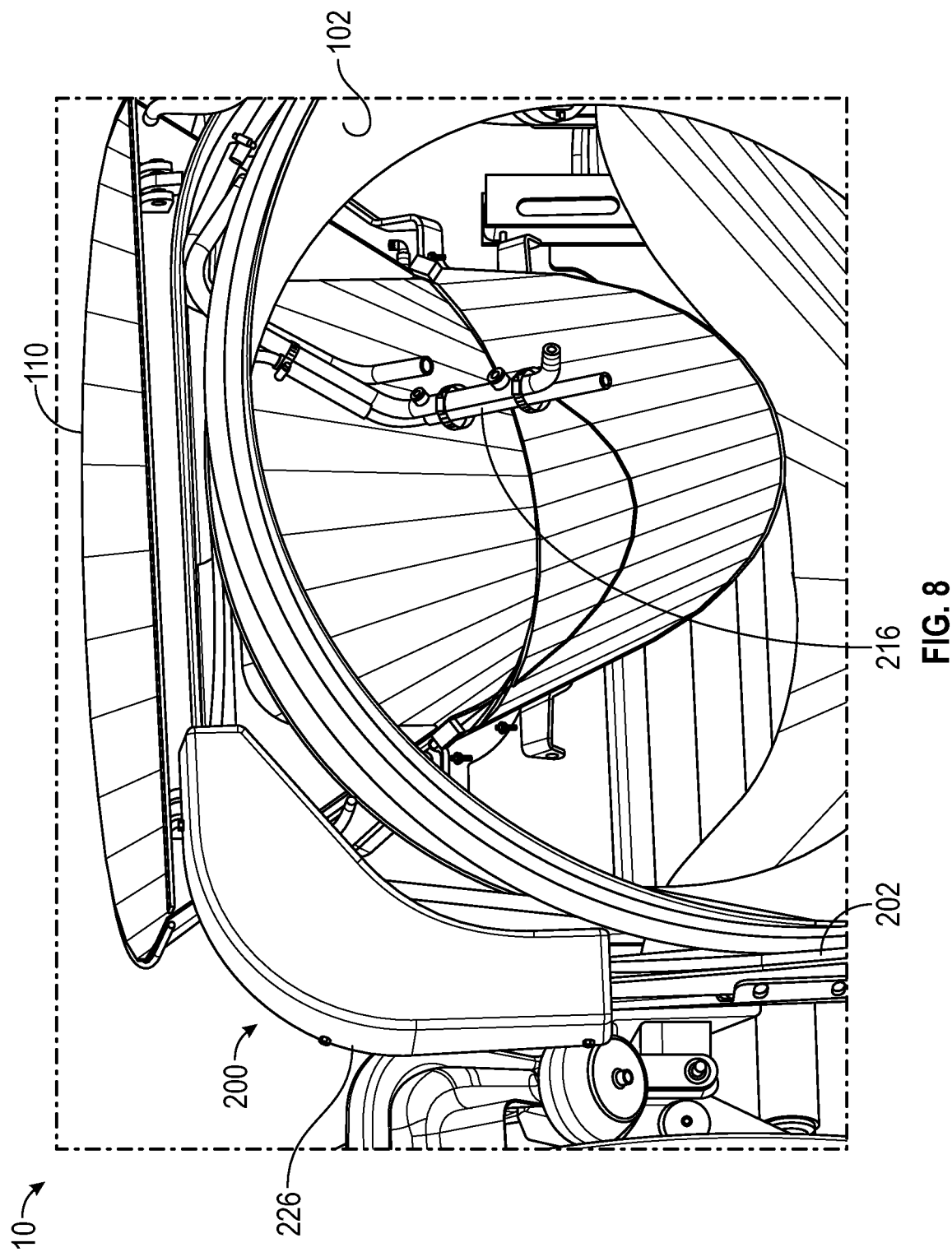
FIG. 8 is a perspective view of a portion of the concrete mixer truck of FIG. 1, showing a portion of the additive admixture system, according to an exemplary embodiment.
Figure 9:
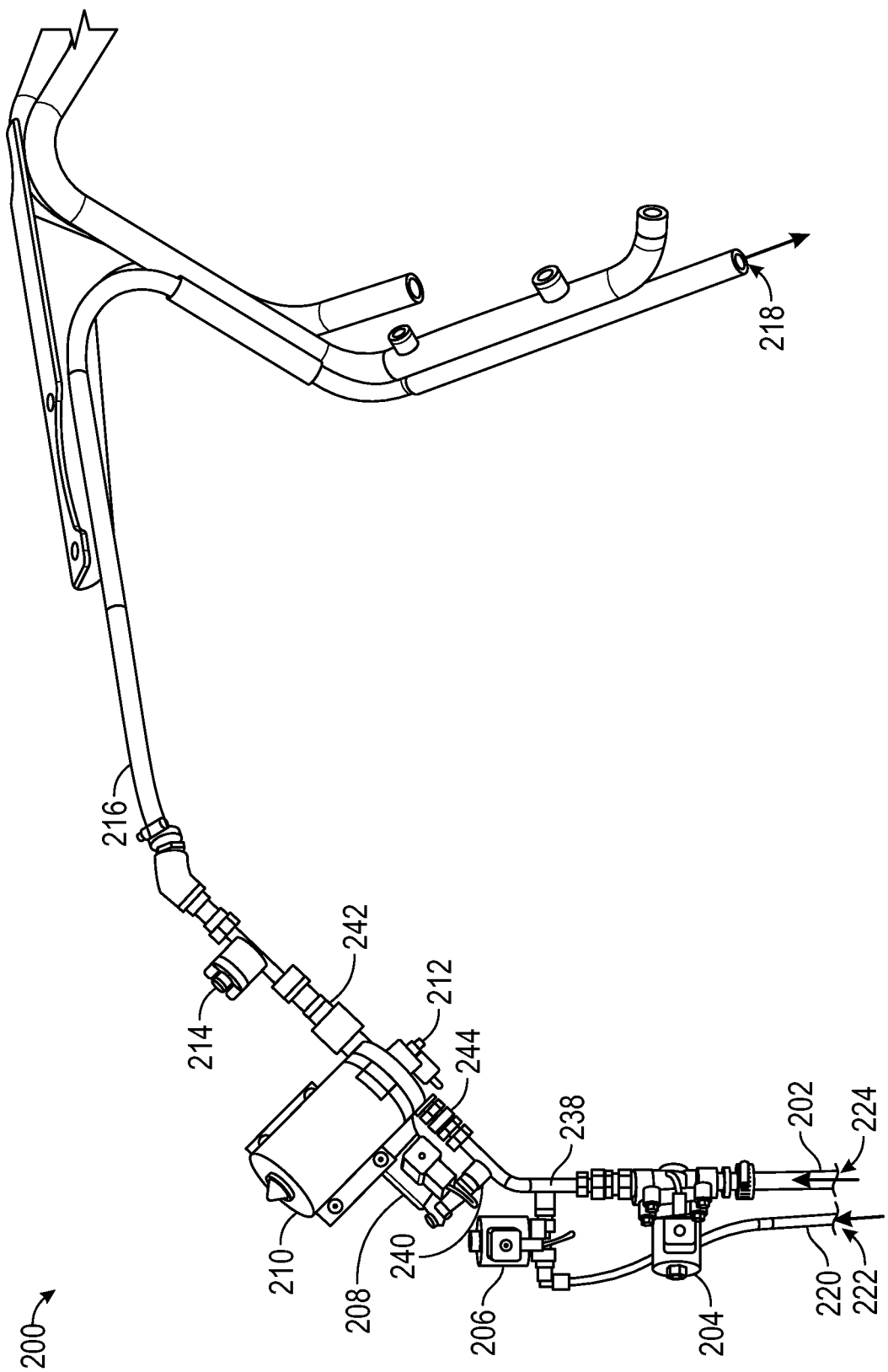
FIG. 9 is a perspective view of the additive admixture system of FIG. 1, according to an exemplary embodiment.
Figure 10:
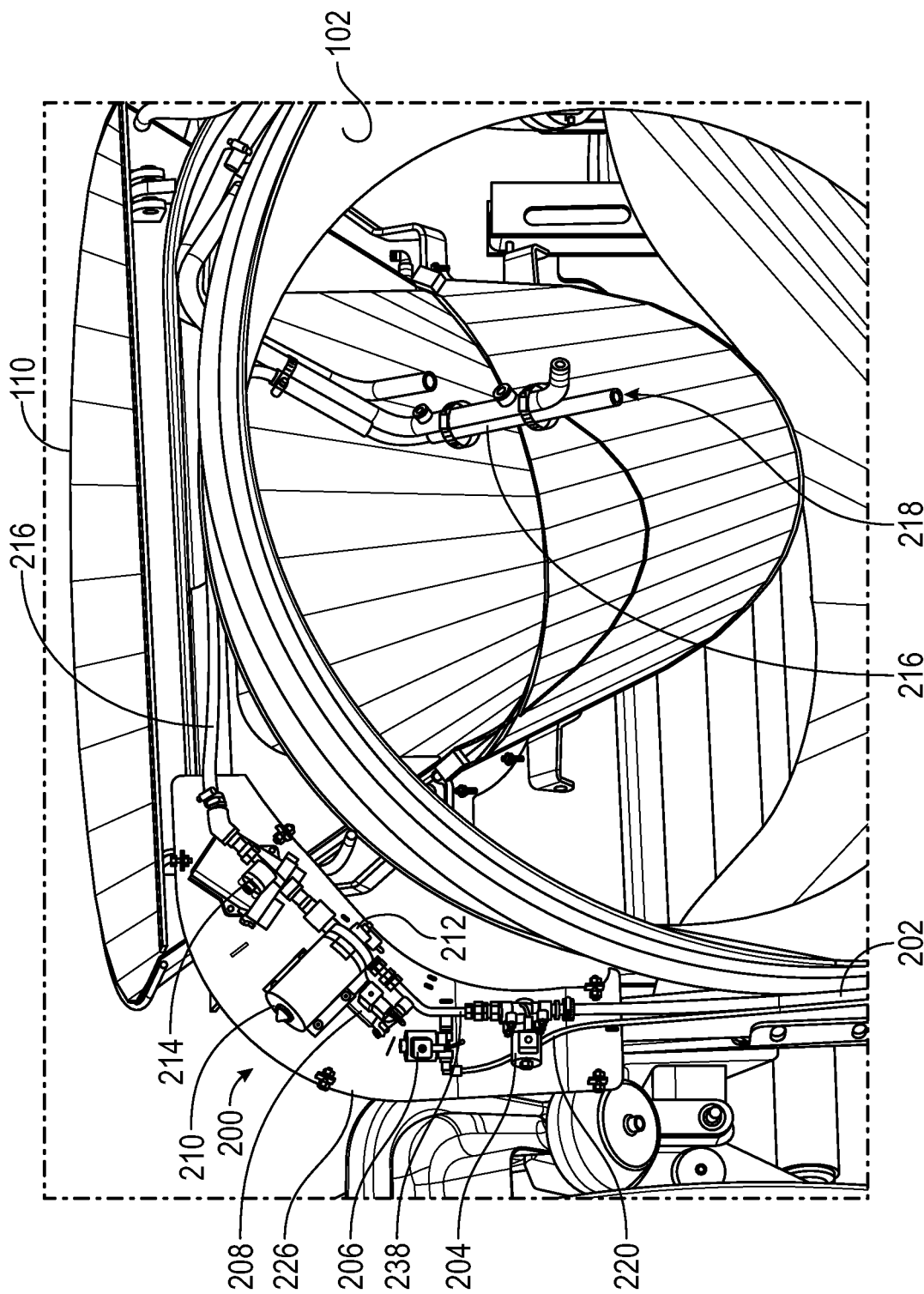
FIG. 10 is a perspective view of a portion of the additive admixture system of FIG. 1, showing a nozzle configured to spray air or liquid into a drum of the concrete mixer truck, according to an exemplary embodiment.
Figure 11:
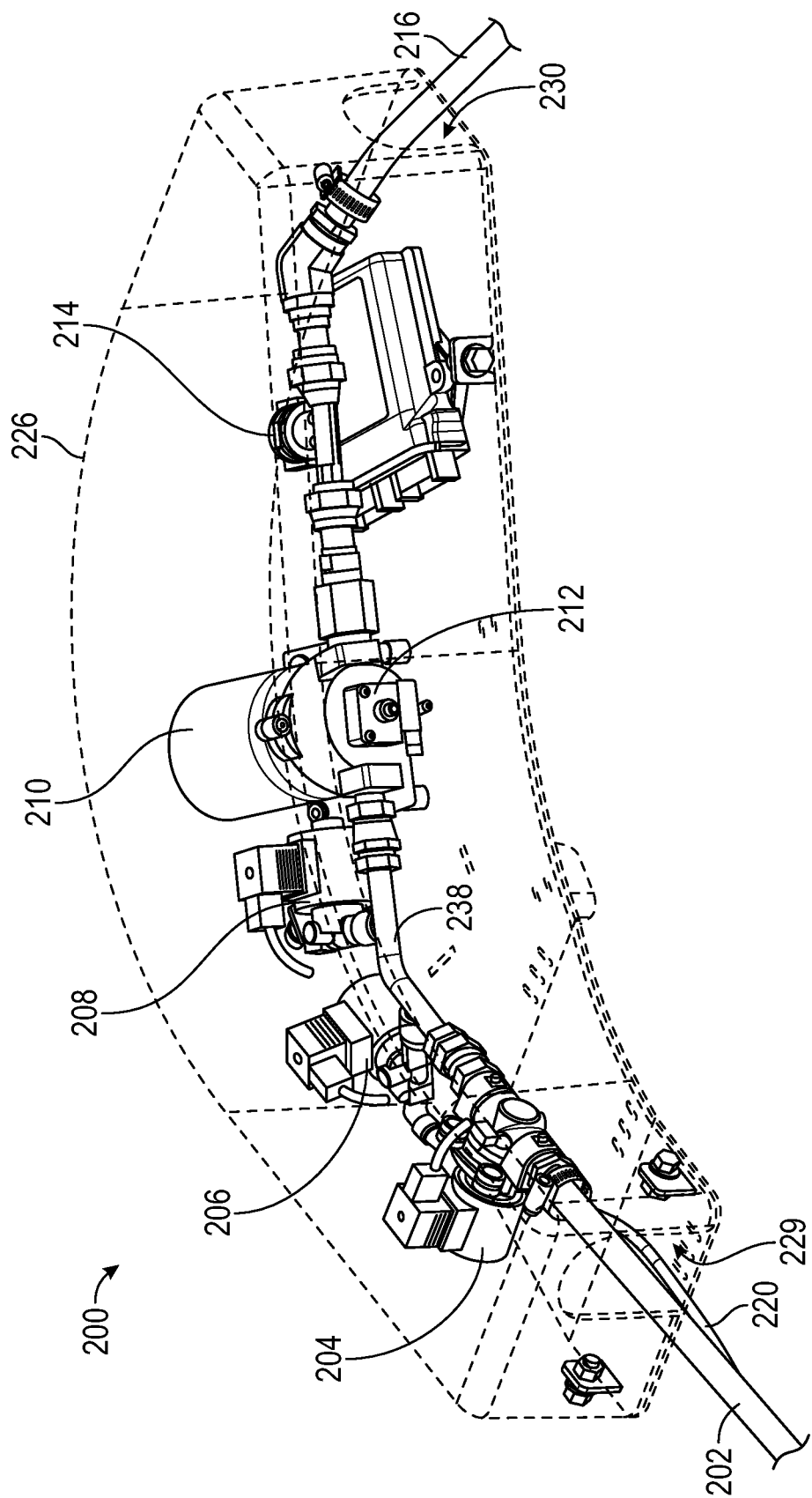
FIG. 11 is a perspective view of a portion of the additive admixture system of FIG. 1, showing various components positioned within a housing, according to an exemplary embodiment.
Figure 12:
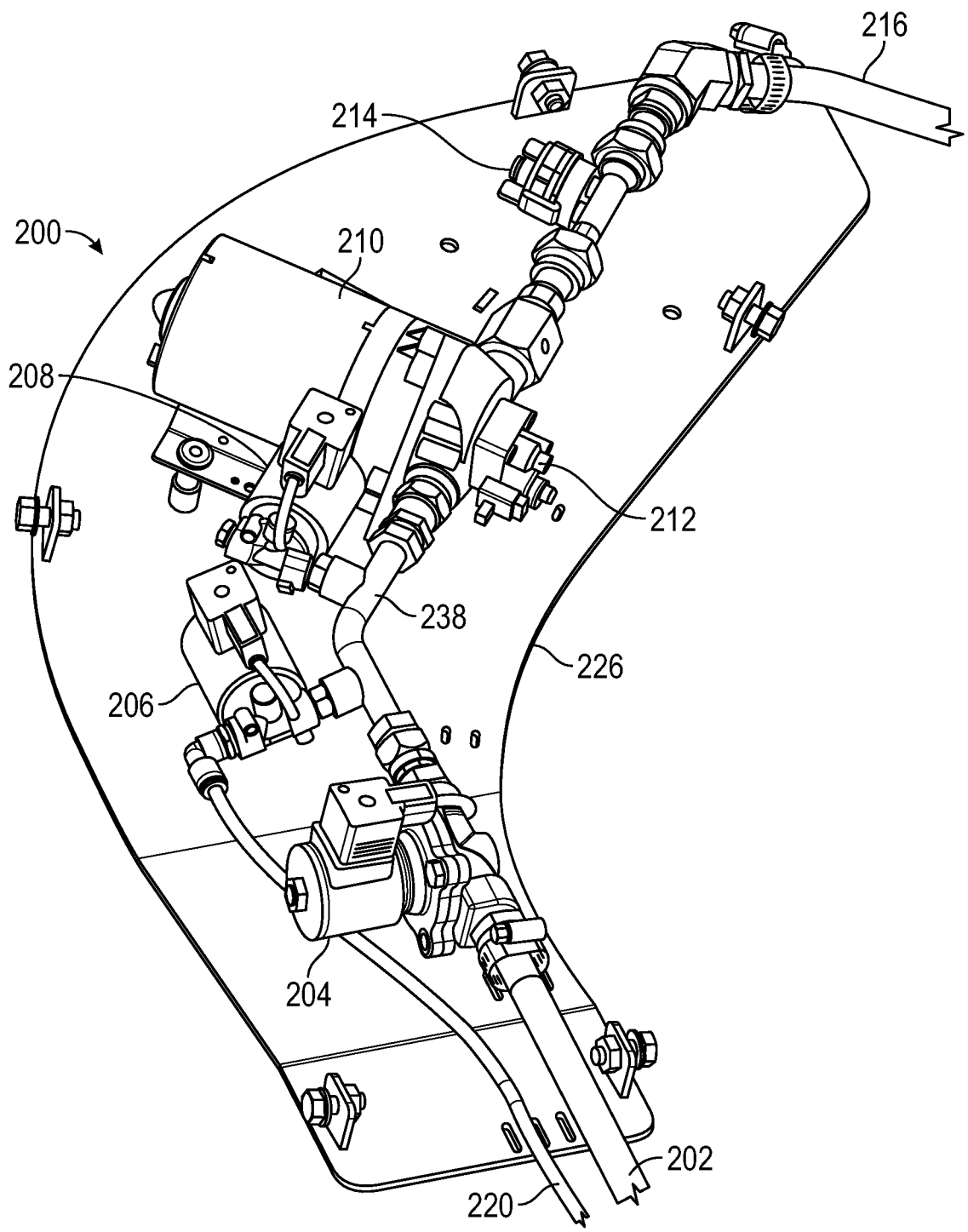
FIG. 12 is a perspective view of a portion of the additive admixture system of FIG. 1, according to an exemplary embodiment.

As shown in FIGS. 1, 3, and 4, the concrete mixer truck 10 includes a prime mover, shown as engine 16. As shown in FIG. 1, the engine 16 is coupled to the frame 12 at a position beneath the cab 14. The engine 16 may be configured to utilize one or more of a variety of fuels (e.g., gasoline, diesel, bio-diesel, ethanol, natural gas, etc.), according to various exemplary embodiments. According to an alternative embodiment, as shown in FIG. 5 and described in more detail herein, the prime mover additionally or alternatively includes one or more electric motors and/or generators, which may be coupled to the frame 12 (e.g., a hybrid vehicle, an electric vehicle, etc.). The electric motors may consume electrical power from an on-board storage device (e.g., batteries, ultra-capacitors, etc.), from an on-board generator (e.g., an internal combustion engine, a genset, etc.), and/or from an external power source (e.g., overhead power lines, etc.) and provide power to systems of the concrete mixer truck 10.

As shown in FIGS. 1 and 4, the concrete mixer truck 10 includes a power transfer device, shown as transmission 18. In one embodiment, the engine 16 produces mechanical power (e.g., due to a combustion reaction, etc.) that flows into the transmission 18. As shown in FIGS. 1 and 4, the concrete mixer truck 10 includes a first drive system, shown as vehicle drive system 20, that is coupled to the transmission 18. The vehicle drive system 20 may include drive shafts, differentials, and other components coupling the transmission 18 with a ground surface to move the concrete mixer truck 10. As shown in FIG. 1, the concrete mixer truck 10 includes a plurality of tractive elements, shown as wheels 22, that engage a ground surface to move the concrete mixer truck 10. In one embodiment, at least a portion of the mechanical power produced by the engine 16 flows through the transmission 18 and into the vehicle drive system 20 to power at least a portion of the wheels 22 (e.g., front wheels, rear wheels, etc.). In one embodiment, energy (e.g., mechanical energy, etc.) flows along a first power path defined from the engine 16, through the transmission 18, and to the vehicle drive system 20.

Figure 2:
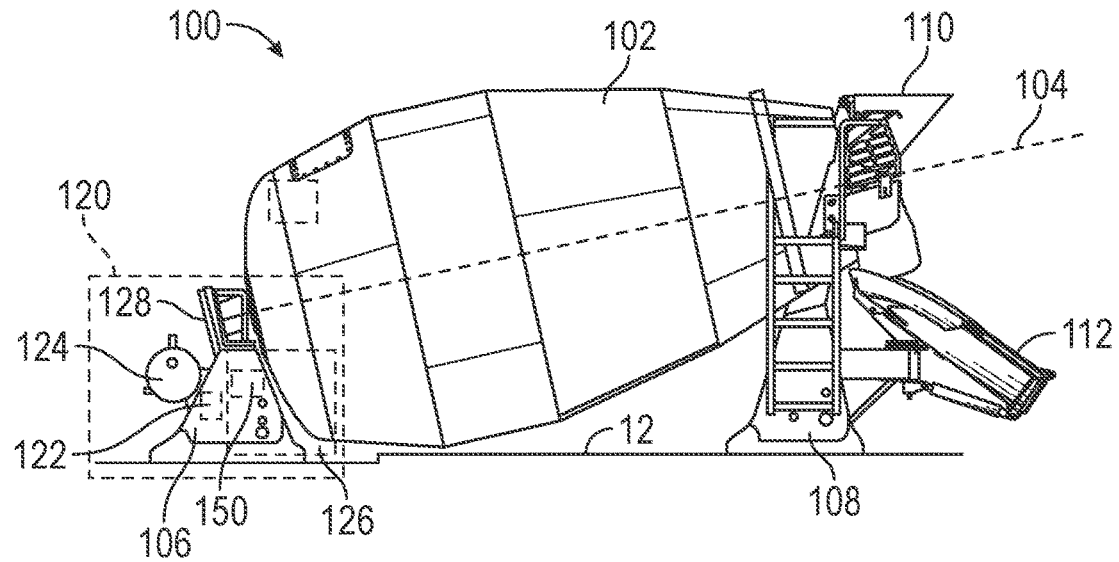
FIG. 2 is a detailed side view of the drum assembly of the concrete mixer truck of FIG. 1, according to an exemplary embodiment.

As shown in FIGS. 1-3 and 5, the drum assembly 100 of the concrete mixer truck 10 includes a drum, shown as mixer drum 102. The mixer drum 102 is coupled to the frame 12 and disposed behind the cab 14 (e.g., at a rear and/or middle of the frame 12, etc.). As shown in FIGS. 1-5, the drum assembly 100 includes a second drive system, shown as drum drive system 120, that is coupled to the frame 12. As shown in FIGS. 1 and 2, the concrete mixer truck 10 includes a first support, shown as front pedestal 106, and a second support, shown as rear pedestal 108. According to an exemplary embodiment, the front pedestal 106 and the rear pedestal 108 cooperatively couple (e.g., attach, secure, etc.) the mixer drum 102 to the frame 12 and facilitate rotation of the mixer drum 102 relative to the frame 12. In an alternative embodiment, the drum assembly 100 is configured as a stand-alone mixer drum that is not coupled (e.g., fixed, attached, etc.) to a vehicle. In such an embodiment, the drum assembly 100 may be mounted to a stand-alone frame. The stand-alone frame may be a chassis including wheels that assist with the positioning of the stand-alone mixer drum on a worksite. Such a stand-alone mixer drum may also be detachably coupled to and/or capable of being loaded onto a vehicle such that the stand-alone mixer drum may be transported by the vehicle.

As shown in FIGS. 1 and 2, the mixer drum 102 defines a central, longitudinal axis, shown as axis 104. According to an exemplary embodiment, the drum drive system 120 is configured to selectively rotate the mixer drum 102 about the axis 104. As shown in FIGS. 1 and 2, the axis 104 is angled relative to the frame 12 such that the axis 104 intersects with the frame 12. According to an exemplary embodiment, the axis 104 is elevated from the frame 12 at an angle in the range of five degrees to twenty degrees. In other embodiments, the axis 104 is elevated by less than five degrees (e.g., four degrees, three degrees, etc.) or greater than twenty degrees (e.g., twenty-five degrees, thirty degrees, etc.). In an alternative embodiment, the concrete mixer truck 10 includes an actuator positioned to facilitate selectively adjusting the axis 104 to a desired or target angle (e.g., manually in response to an operator input/command, automatically according to a control scheme, etc.).

As shown in FIGS. 1 and 2, the mixer drum 102 of the drum assembly 100 includes an inlet, shown as hopper 110, and an outlet, shown as chute 112. According to an exemplary embodiment, the mixer drum 102 is configured to receive a mixture, such as a concrete mixture (e.g., cementitious material, aggregate, sand, etc.), with the hopper 110. The mixer drum 102 may include a mixing element (e.g., fins, etc.) positioned within the interior thereof. The mixing element may be configured to (i) agitate the contents of mixture within the mixer drum 102 when the mixer drum 102 is rotated by the drum drive system 120 in a first direction (e.g., counterclockwise, clockwise, etc.) and (ii) drive the mixture within the mixer drum 102 out through the chute 112 when the mixer drum 102 is rotated by the drum drive system 120 in an opposing second direction (e.g., clockwise, counterclockwise, etc.).

According to the exemplary embodiment shown in FIGS. 2-4, the drum drive system is a hydraulic drum drive system. As shown in FIGS. 2-4, the drum drive system 120 includes a pump, shown as pump 122; a reservoir, shown as fluid reservoir 124, fluidly coupled to the pump 122; and an actuator, shown as drum motor 126. As shown in FIGS. 3 and 4, the pump 122 and the drum motor 126 are fluidly coupled. According to an exemplary embodiment, the drum motor 126 is a hydraulic motor, the fluid reservoir 124 is a hydraulic fluid reservoir, and the pump 122 is a hydraulic pump. The pump 122 may be configured to pump fluid (e.g., hydraulic fluid, etc.) stored within the fluid reservoir 124 to drive the drum motor 126.

According to an exemplary embodiment, the pump 122 is a variable displacement hydraulic pump (e.g., an axial piston pump, etc.) and has a pump stroke that is variable. The pump 122 may be configured to provide hydraulic fluid at a flow rate that varies based on the pump stroke (e.g., the greater the pump stroke, the greater the flow rate provided to the drum motor 126, etc.). The pressure of the hydraulic fluid provided by the pump 122 may also increase in response to an increase in pump stroke (e.g., where pressure may be directly related to work load, higher flow may result in higher pressure, etc.). The pressure of the hydraulic fluid provided by the pump 122 may alternatively not increase in response to an increase in pump stroke (e.g., in instances where there is little or no work load, etc.). The pump 122 may include a throttling element (e.g., a swash plate, etc.). The pump stroke of the pump 122 may vary based on the orientation of the throttling element. In one embodiment, the pump stroke of the pump 122 varies based on an angle of the throttling element (e.g., relative to an axis along which the pistons move within the axial piston pump, etc.). By way of example, the pump stroke may be zero where the angle of the throttling element is equal to zero. The pump stroke may increase as the angle of the throttling element increases. According to an exemplary embodiment, the variable pump stroke of the pump 122 provides a variable speed range of up to about 10:1. In other embodiments, the pump 122 is configured to provide a different speed range (e.g., greater than 10:1, less than 10:1, etc.).

In one embodiment, the throttling element of the pump 122 is movable between a stroked position (e.g., a maximum stroke position, a partially stroked position, etc.) and a destroked position (e.g., a minimum stroke position, a partially destroked position, etc.). According to an exemplary embodiment, an actuator is coupled to the throttling element of the pump 122. The actuator may be positioned to move the throttling element between the stroked position and the destroked position. In some embodiments, the pump 122 is configured to provide no flow, with the throttling element in a non-stroked position, in a default condition (e.g., in response to not receiving a stroke command, etc.). The throttling element may be biased into the non-stroked position. In some embodiments, the drum control system 150 is configured to provide a first command signal. In response to receiving the first command signal, the pump 122 (e.g., the throttling element by the actuator thereof, etc.) may be selectively reconfigured into a first stroke position (e.g., stroke in one direction, a destroked position, etc.). In some embodiments, the drum control system 150 is configured to additionally or alternatively provide a second command signal. In response to receiving the second command signal, the pump 122 (e.g., the throttling element by the actuator thereof, etc.) may be selectively reconfigured into a second stroke position (e.g., stroke in an opposing second direction, a stroked position, etc.). The pump stroke may be related to the position of the throttling element and/or the actuator.

According to another exemplary embodiment, a valve is positioned to facilitate movement of the throttling element between the stroked position and the destroked position. In one embodiment, the valve includes a resilient member (e.g., a spring, etc.) configured to bias the throttling element in the destroked position (e.g., by biasing movable elements of the valve into positions where a hydraulic circuit actuates the throttling element into the destroked positions, etc.). Pressure from fluid flowing through the pump 122 may overcome the resilient member to actuate the throttling element into the stroked position (e.g., by actuating movable elements of the valve into positions where a hydraulic circuit actuates the throttling element into the stroked position, etc.).

As shown in FIG. 4, the concrete mixer truck 10 includes a power takeoff unit, shown as power takeoff unit 32, that is coupled to the transmission 18. In another embodiment, the power takeoff unit 32 is coupled directly to the engine 16. In one embodiment, the transmission 18 and the power takeoff unit 32 include mating gears that are in meshing engagement. A portion of the energy provided to the transmission 18 flows through the mating gears and into the power takeoff unit 32, according to an exemplary embodiment. In one embodiment, the mating gears have the same effective diameter. In other embodiments, at least one of the mating gears has a larger diameter, thereby providing a gear reduction or a torque multiplication and increasing or decreasing the gear speed.

As shown in FIG. 4, the power takeoff unit 32 is selectively coupled to the pump 122 with a clutch 34. In other embodiments, the power takeoff unit 32 is directly coupled to the pump 122 (e.g., without clutch 34, etc.). In some embodiments, the concrete mixer truck 10 does not include the clutch 34. By way of example, the power takeoff unit 32 may be directly coupled to the pump 122 (e.g., a direct configuration, a non-clutched configuration, etc.). According to an alternative embodiment, the power takeoff unit 32 includes the clutch 34 (e.g., a hot shift PTO, etc.). In one embodiment, the clutch 34 includes a plurality of clutch discs. When the clutch 34 is engaged, an actuator forces the plurality of clutch discs into contact with one another, which couples an output of the transmission 18 with the pump 122. In one embodiment, the actuator includes a solenoid that is electronically actuated according to a clutch control strategy. When the clutch 34 is disengaged, the pump 122 is not coupled to (i.e., is isolated from) the output of the transmission 18. Relative movement between the clutch discs or movement between the clutch discs and another component of the power takeoff unit 32 may be used to decouple the pump 122 from the transmission 18.

In one embodiment, energy flows along a second power path defined from the engine 16, through the transmission 18 and the power takeoff unit 32, and into the pump 122 when the clutch 34 is engaged. When the clutch 34 is disengaged, energy flows from the engine 16, through the transmission 18, and into the power takeoff unit 32. The clutch 34 selectively couples the pump 122 to the engine 16, according to an exemplary embodiment. In one embodiment, energy along the first flow path is used to drive the wheels 22 of the concrete mixer truck 10, and energy along the second flow path is used to operate the drum drive system 120 (e.g., power the pump 122, etc.). By way of example, the clutch 34 may be engaged such that energy flows along the second flow path when the pump 122 is used to provide hydraulic fluid to the drum motor 126. When the pump 122 is not used to drive the mixer drum 102 (e.g., when the mixer drum 102 is empty, etc.), the clutch 34 may be selectively disengaged, thereby conserving energy. In embodiments without clutch 34, the mixer drum 102 may continue turning (e.g., at low speed) when empty.

The drum motor 126 is positioned to drive the rotation of the mixer drum 102. In some embodiments, the drum motor 126 is a fixed displacement motor. In some embodiments, the drum motor 126 is a variable displacement motor. In one embodiment, the drum motor 126 operates within a variable speed range up to about 3:1 or 4:1. In other embodiments, the drum motor 126 is configured to provide a different speed range (e.g., greater than 4:1, less than 3:1, etc.). According to an exemplary embodiment, the speed range of the drum drive system 120 is the product of the speed range of the pump 122 and the speed range of the drum motor 126. The drum drive system 120 having a variable pump 122 and a variable drum motor 126 may thereby have a speed range that reaches up to 30:1 or 40:1 (e.g., without having to operate the engine 16 at a high idle condition, etc.). According to an exemplary embodiment, increased speed range of the drum drive system 120 having a variable displacement motor and a variable displacement pump relative to a drum drive system having a fixed displacement motor frees up boundary limits for the engine 16, the pump 122, and the drum motor 126. Advantageously, with the increased capacity of the drum drive system 120, the engine 16 does not have to run at either high idle or low idle during the various operating modes of the drum assembly 100 (e.g., mixing mode, discharging mode, filling mode, etc.), but rather the engine 16 may be operated at a speed that provides the most fuel efficiency and most stable torque. Also, the pump 122 and the drum motor 126 may not have to be operated at displacement extremes to meet the speed requirements for the mixer drum 102 during various applications, but can rather be modulated to the most efficient working conditions (e.g., by the drum control system 150, etc.).

As shown in FIG. 2, the drum drive system 120 includes a drive mechanism, shown as drum drive wheel 128, coupled to the mixer drum 102. The drum drive wheel 128 may be welded, bolted, or otherwise secured to the head of the mixer drum 102. The center of the drum drive wheel 128 may be positioned along the axis 104 such that the drum drive wheel 128 rotates about the axis 104. According to an exemplary embodiment, the drum motor 126 is coupled to the drum drive wheel 128 (e.g., with a belt, a chain, a gearing arrangement, etc.) to facilitate driving the drum drive wheel 128 and thereby rotate the mixer drum 102. The drum drive wheel 128 may be or include a sprocket, a cogged wheel, a grooved wheel, a smooth-sided wheel, a sheave, a pulley, or still another member. In other embodiments, the drum drive system 120 does not include the drum drive wheel 128. By way of example, the drum drive system 120 may include a gearbox that couples the drum motor 126 to the mixer drum 102. By way of another example, the drum motor 126 (e.g., an output thereof, etc.) may be directly coupled to the mixer drum 102 (e.g., along the axis 104, etc.) to rotate the mixer drum 102.

According to the exemplary embodiment shown in FIG. 5, the drum drive system 120 of the drum assembly 100 is configured to be an electric drum drive system. As shown in FIG. 5, the drum drive system 120 includes the drum motor 126, which is electrically powered to drive the mixer drum 102. By way of example, in an embodiment where the concrete mixer truck 10 has a hybrid powertrain, the engine 16 may drive a generator (e.g., with the power takeoff unit 32, etc.), shown as generator 130, to generate electrical power that is (i) stored for future use by the drum motor 126 in storage (e.g., battery cells, etc.), shown as energy storage source 132, and/or (ii) provided directly to drum motor 126 to drive the mixer drum 102. The energy storage source 132 may additionally be chargeable using a mains power connection (e.g., through a charging station, etc.). By way of another example, in an embodiment where the concrete mixer truck 10 has an electric powertrain, the engine 16 may be replaced with a main motor, shown as primary motor 26, that drives the wheels 22. The primary motor 26 and the drum motor 126 may be powered by the energy storage source 132 and/or the generator 130 (e.g., a regenerative braking system, etc.).

According to the exemplary embodiments shown in FIGS. 3 and 5, the drum control system 150 for the drum assembly 100 of the concrete mixer truck 10 includes a controller, shown as drum assembly controller 152. In one embodiment, the drum assembly controller 152 is configured to selectively engage, selectively disengage, control, and/or otherwise communicate with components of the drum assembly 100 and/or the concrete mixer truck 10 (e.g., actively control the components thereof, etc.). As shown in FIGS. 3 and 5, the drum assembly controller 152 is coupled to the engine 16, the primary motor 26, the pump 122, the drum motor 126, the generator 130, the energy storage source 132, a pressure sensor 154, a temperature sensor 156, a speed sensor 158, a motor sensor 160, an input/output ("I/O") device 170, and/or a remote server 180. In other embodiments, the drum assembly controller 152 is coupled to more or fewer components. By way of example, the drum assembly controller 152 may send and/or receive signals with the engine 16, the primary motor 26, the pump 122, the drum motor 126, the generator 130, the energy storage source 132, the pressure sensor 154, the temperature sensor 156, the speed sensor 158, the motor sensor 160, the I/O device 170, and/or the remote server 180.

The drum assembly controller 152 may be implemented as hydraulic controls, a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to an exemplary embodiment, the drum assembly controller 152 includes a processing circuit having a processor and a memory. The processing circuit may include an ASIC, one or more FPGAs, a DSP, circuits containing one or more processing components, circuitry for supporting a microprocessor, a group of processing components, or other suitable electronic processing components. In some embodiments, the processor is configured to execute computer code stored in the memory to facilitate the activities described herein. The memory may be any volatile or non-volatile computer-readable storage medium capable of storing data or computer code relating to the activities described herein. According to an exemplary embodiment, the memory includes computer code modules (e.g., executable code, object code, source code, script code, machine code, etc.) configured for execution by the processor.

According to an exemplary embodiment, the drum assembly controller 152 is configured to facilitate detecting the buildup of concrete within the mixer drum 102. By way of example, over time after various concrete discharge cycles, concrete may begin to build up and harden within the mixer drum 102. Such buildup is disadvantageous because of the increased weight of the concrete mixer truck 10 and decreased charge capacity of the mixer drum 102. Such factors may reduce the efficiency of concrete delivery. Therefore, the concrete that has built up must be cleaned from the interior of the mixer drum 102 (i.e., using a chipping process). Typically, the buildup is monitored either (i) manually by the operator of the concrete mixer truck 10 (e.g., by inspecting the interior of the mixer drum 102, etc.) or (ii) using expensive load cells to detect a change in mass of the mixer drum 102 when empty. According to an exemplary embodiment, the drum assembly controller 152 is configured to automatically detect concrete buildup within the mixer drum 102 using sensor measurements from more cost effective sensors and processes.

Referring particularly to FIGS. 6-20, additive admixture system 200 is shown in greater detail, according to an exemplary embodiment. Additive admixture system 200 may be configured to use compressed air to clear one or more lines, conduits, tubular members, etc., when additive is added to the mixer drum 102. As shown in FIGS. 6-8, 10, 14, and 20, additive admixture system 200 may extend along a side of mixer drum 102 and can include an outlet line 216 (e.g., a conduit, a tubular member, a hose, piping, etc.) that extends into mixer drum 102. Outlet line 216 may extend into mixer drum 102 over hopper 110 so that additive, fluid, air, gas, etc., that is transferred through outlet line 216 enters mixer drum 102 proximate hopper 110. Outlet line 216 includes an opening, a window, an aperture, a hole, etc., shown as outlet opening 218, through which fluid, liquid, additive, air, gas, etc., exits.

Referring particularly to FIGS. 9-14, additive admixture system 200 includes a first inlet conduit, tubular member, hollow member, pipe, hose, line, etc., shown as first inlet line 202 and a second inlet conduit, tubular member, hollow member, pipe, hose, line, etc., shown as second inlet line 220. Additive admixture system 200 also includes a valve 204 (e.g., a fluid valve), an air valve 206, an air inlet valve 208, a pump 210, a check valve 212, and a meter 214.

Valve 204 may be fluidly coupled in-line with first inlet line 202 and can be transitionable between an open position and a closed position to allow or restrict flow through first inlet line 202. First inlet line 202 can fluidly couple with a tank, a container, a reservoir, etc., shown as tank 228. Valve 204 may be an electronic valve that is electrically controllable or operable by a controller, processing device, control system, etc. In some embodiments, valve 204 is normally in the open position so that pump 210 can operate to draw fluid from tank 228.

Air valve 206 can be similar to valve 204. For example, air valve 206 may be an electronic valve that is controllable by a controller, processing device, control system, etc. Air valve 206 is fluidly coupled in-line with second inlet line 220 and may be transitionable between an open position and a closed position to allow or restrict flow of air through second inlet line 220. In some embodiments, air valve 206 is operated so that fluid may be driven into mixer drum 102 when air valve 206 is transitioned into the closed position. Air valve 206 may transition into the closed position and maintain the closed position as fluid is driven from tank 228 to mixer drum 102 by pump 210.

Pump 210 may be an electric pump. For example, pump 210 can be a 12-volt suction or discharge pump that may be controllable or operable by a controller, a processing device, a control system, etc. In some embodiments, pump 210 is a variable displacement pump so that a flow rate of fluid drawn from tank 228 and discharged into mixer drum 102 can be adjusted or controlled. Pump 210 may draw electrical energy from an energy storage system of concrete mixer truck 10. Concrete mixer truck 10 can include one or more battery cells, electrical energy storage devices, capacitors, an energy storage system, etc., configured to store electrical energy that can be used (e.g., by a control system) to operate pump 210.

Meter 214 can be positioned downstream from pump 210 (e.g., downstream from pump 210 but upstream from outlet line 216) so that meter 214 measures a flow rate, volume, mass, speed, etc., of fluid discharged by pump 210. In other embodiments, meter 214 is positioned upstream from pump 210 (e.g., on a suction side of pump 210) between pump 210 and tank 228. Meter 214 can obtain any of the flow rate, volume, mass, speed, etc., of fluid discharged by pump 210 or suctioned from tank 228 by pump 210 as meter information and may provide the meter information to a controller or control system of concrete mixer truck 10.

Check valve 212 can be fluidly coupled in-line with pump 210 (e.g., on the suction side of pump 210 or on a discharge side of pump 210) to prevent fluid downstream from pump 210 from draining back into tank 228 (e.g., when air inlet valve 208 and valve 204 are in the open position). Check valve 212 can be a swing, lift (e.g., a piston or ball), stop, or tilting-disc check valve, or any other type of check valve that allows flow of fluid in a first direction but restricts or prevents flow of fluid in a second, opposite direction.

Valve 204 is fluidly coupled with first inlet line 202 and an intermediate line 238. Air valve 206 is fluidly coupled with second inlet line 220 and intermediate line 238. Intermediate line 238 may be or include a T-connector that feeds into check valve 212 or pump 210. Air inlet valve 208 may be fluidly coupled with intermediate line 238 through a coupler 240 and may transition between an open and a closed position to allow air to enter intermediate line 238 so that fluid may be returned or fall back into tank 228 without requiring operation of pump 210 (e.g., to de-pressurize intermediate line 238). Pump 210 is fluidly coupled with meter 214 through an outlet coupler 242 on its discharge side and is fluidly coupled with intermediate line 248 through coupler 244 on the suction side of pump 210. Meter 214 is fluidly coupled with outlet line 216, downstream of pump 210 (e.g., on the discharge side of pump 210).

Figure 13:
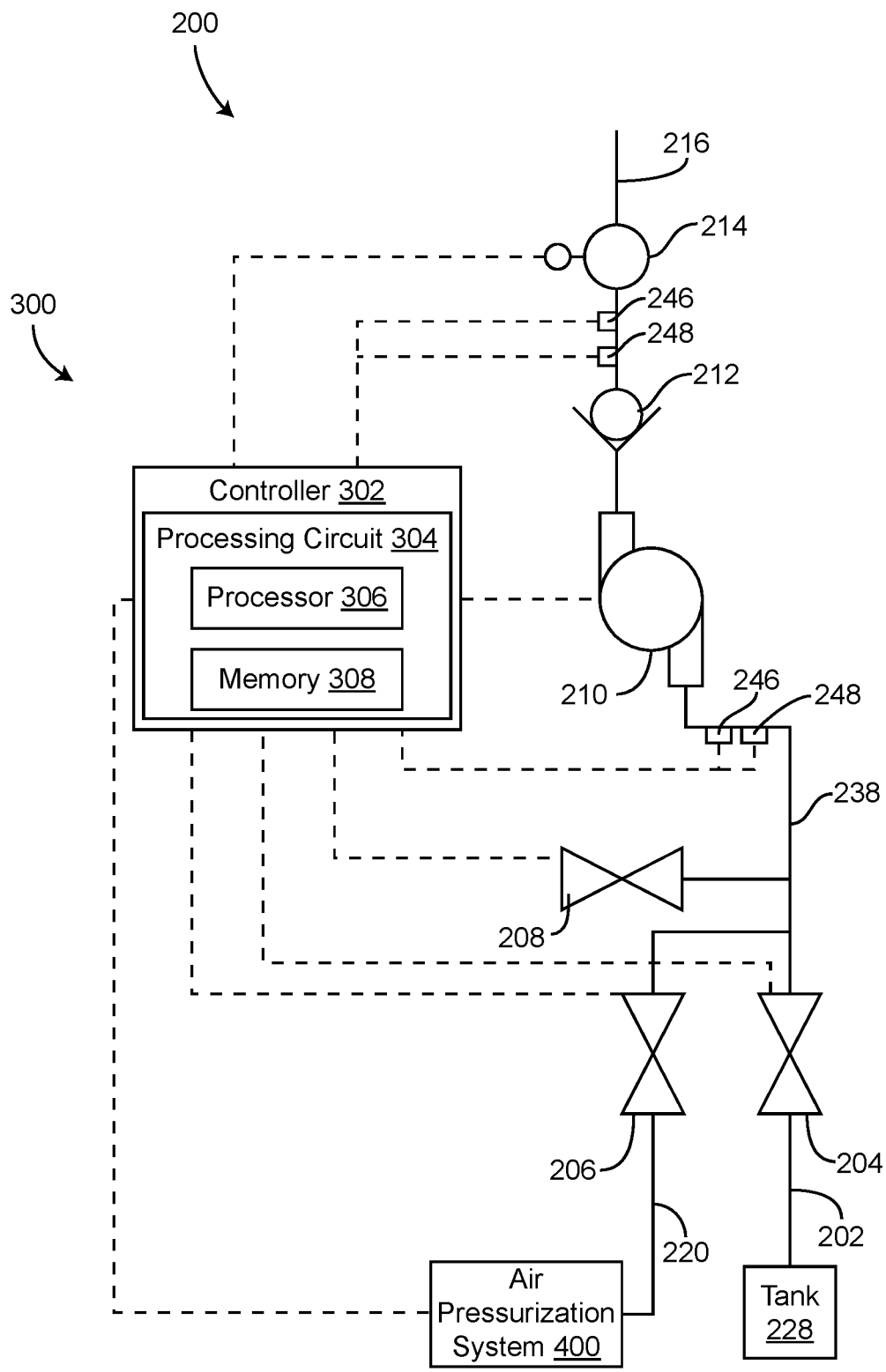
FIG. 13 is a block diagram of the additive admixture system of FIG. 1, according to an exemplary embodiment.
Figure 14:
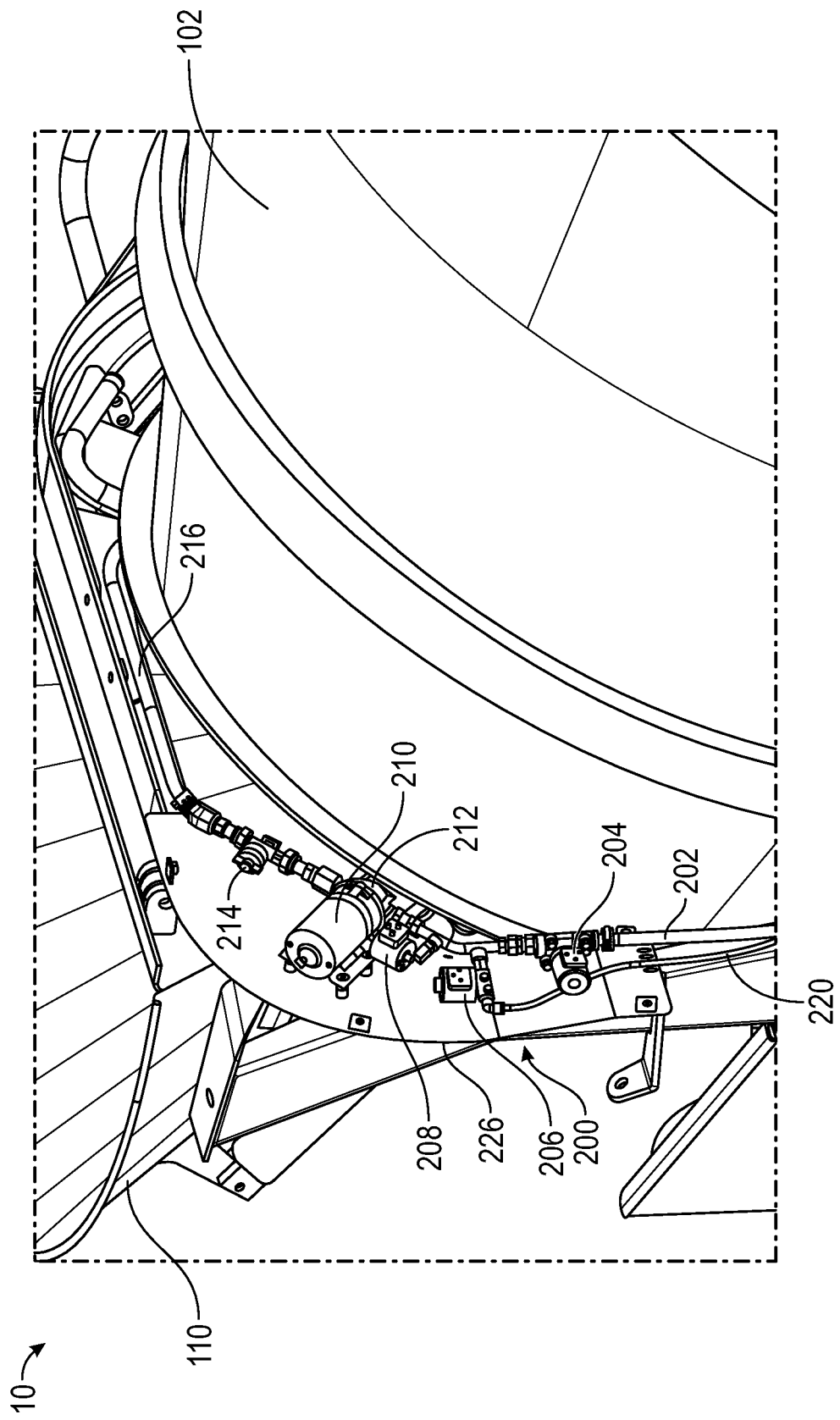
FIG. 14 is a perspective view of the concrete mixer truck and the additive admixture system of FIG. 1, according to an exemplary embodiment.
Figure 15:
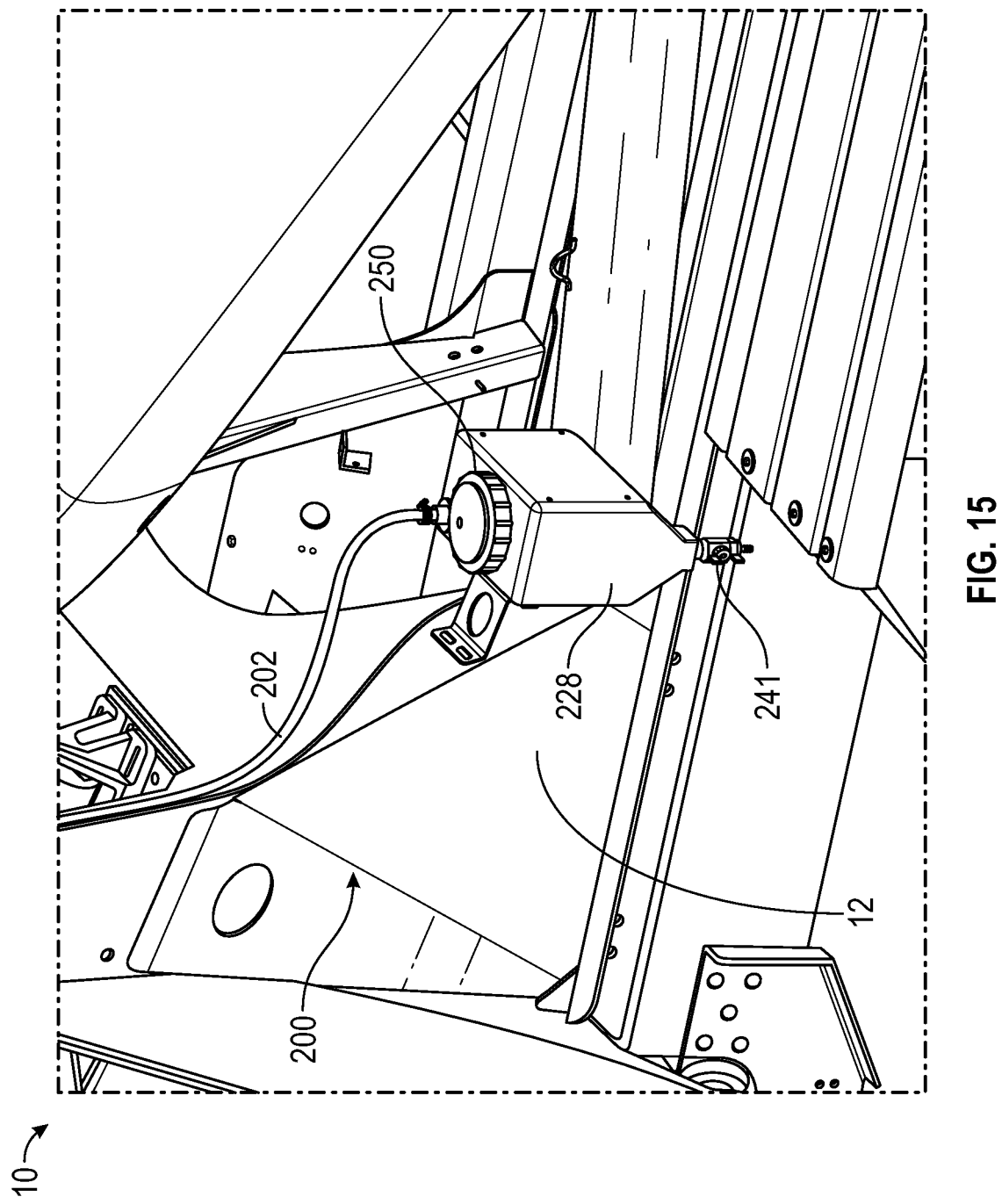
FIG. 15 is a perspective view of a tank of the additive admixture system of FIG. 1 fixedly coupled with the concrete mixer truck, according to an exemplary embodiment.
Figure 16:
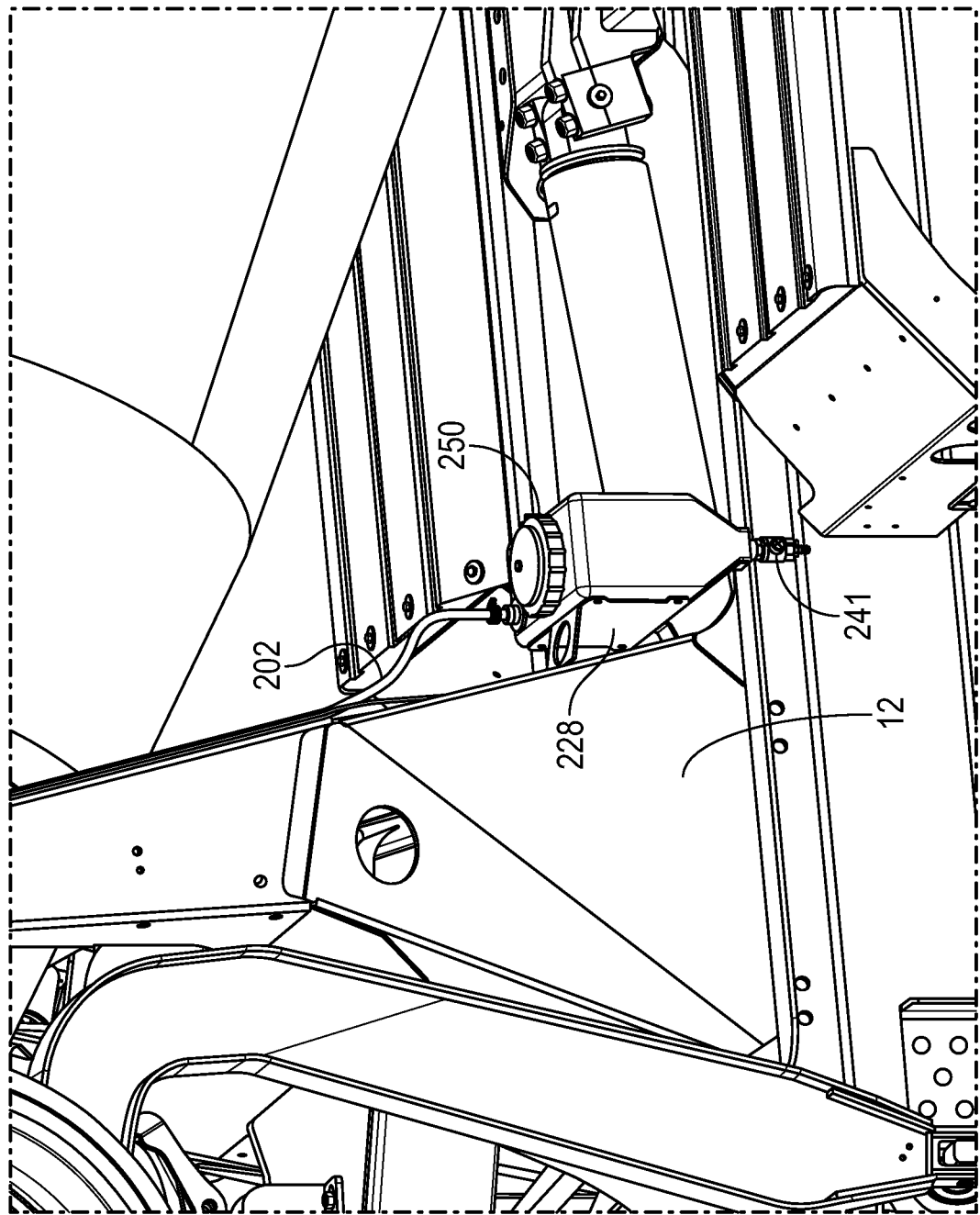
FIG. 16 is a perspective view of the tank of FIG. 15, according to an exemplary embodiment.
Figure 20:
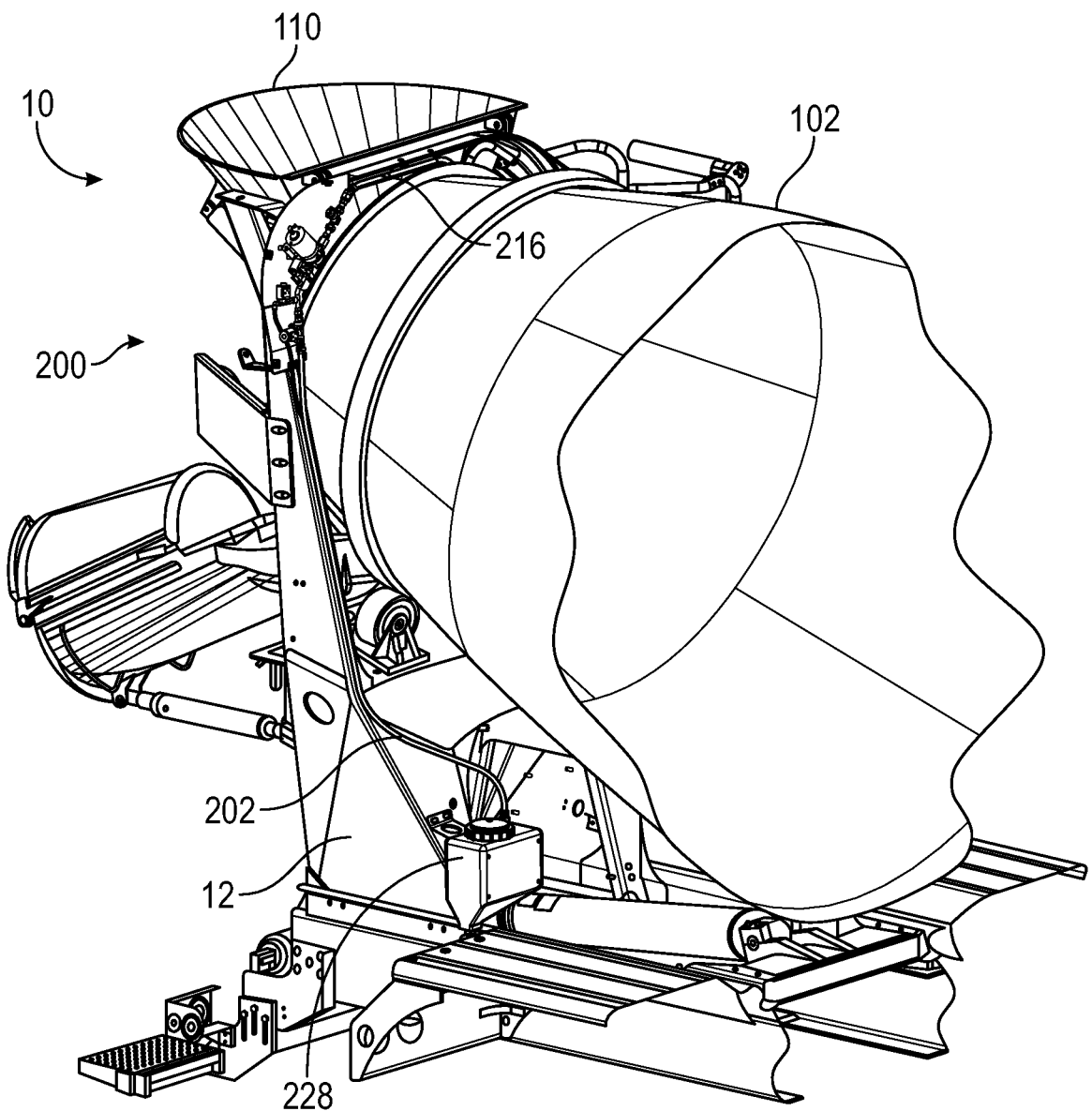
FIG. 20 is a perspective view of a portion of the concrete mixer truck of FIG. 1, showing the additive admixture system in greater detail, according to an exemplary embodiment.

Referring particularly to FIG. 13, concrete mixer truck 10 may include a control system 300 for operating additive admixture system 200. Control system 300 includes a controller 302 that is communicably coupled with pump 210, meter 214, air inlet valve 208, air valve 206, and valve 204. Controller 302 can be configured to operate any of pump 210, air inlet valve 208, air valve 206, or valve 204. For example, controller 302 may generate control signals for pump 210 to operate pump 210 at various speeds. Controller 302 may also generate control signals for any of air inlet valve 208, air valve 206, or valve 204 to transition valves 204-208 between their open positions and closed positions. Controller 302 can also receive the meter information from meter 214 and may use the meter information to generate the control signals for pump 210, valve 204, air valve 206, and/or air inlet valve 208. It should be understood that any operations of pump 210, valve 204, air valve 206, and/or air inlet valve 208 as described herein may be performed as a result of receiving control signals from controller 302. In this way, additive admixture system 200 and the various controllable components thereof can be operated by controller 302 of control system 300. In some embodiments, air inlet valve 208 is optional and additive admixture system 200 can be otherwise vented to atmospheric pressure.

Controller 302 is shown to include a processing circuit 304 including a processor 306 and memory 308. Processor 306 may be a general purpose or specific purpose processor, an application specific integrated circuit (ASIC), one or more field programmable gate arrays (FPGAs), a group of processing components, or other suitable processing components. Processor 306 is configured to execute computer code or instructions stored in memory 308 or received from other computer readable media (e.g., CDROM, network storage, a remote server, etc.). In some embodiments, controller 302 is a processing unit that is the same as or similar to controller 152 as described in greater detail above with reference to FIG. 5.

Memory 308 may include one or more devices (e.g., memory units, memory devices, storage devices, etc.) for storing data and/or computer code for completing and/or facilitating the various processes described in the present disclosure. Memory 308 may include random access memory (RAM), read-only memory (ROM), hard drive storage, temporary storage, non-volatile memory, flash memory, optical memory, or any other suitable memory for storing software objects and/or computer instructions. Memory 308 may include database components, object code components, script components, or any other type of information structure for supporting the various activities and information structures described in the present disclosure. Memory 308 may be communicably connected to processor 306 via processing circuit 304 and may include computer code for executing (e.g., by processor 306) one or more processes described herein. When processor 306 executes instructions stored in memory 308, processor 306 generally configures controller 302 (and more particularly processing circuit 304) to complete such activities.

During operation of additive admixture system 200, valve 204 is transitioned into the open position or state so that fluid may be drawn by pump 210 from tank 228. Valve 204 may be transitioned into the open position by controller 302. For example, controller 302 may generate control signals for valve 204 to transition valve 204 from the closed position/state to the open position/state or to ensure that valve 204 is currently in the open position/state. Controller 302 may also generate control signals for air inlet valve 208 and air valve 206 so that air inlet valve 208 and air valve 206 are transitioned into or maintained in their closed positions/states. With valve 204 opened, air inlet valve 208 closed, and air valve 206 closed, pump 210 may operate so that a desired amount of fluid is discharged into mixer drum 102.

Controller 302 can operate pump 210 while monitoring the meter information received from meter 214 so that the desired amount of fluid is discharged into mixer drum 102. Controller 302 may receive the meter information from meter 214 and operate pump 210 according to a closed-loop control scheme. Controller 302 may also account for volume, mass, or amount of fluid present in additive admixture system 200 upstream of meter 214 but downstream of pump 210, or volume, mass, or amount of fluid present in additive admixture system 200 upstream of meter 214 but downstream of check valve 212. For example, the meter information may indicate that a cumulative volume V add (t) of fluid has passed through meter 214 or been added to mixer drum 102 at time t. Controller 302 may operate pump 210 until a desired volume $V_{desired}$ (or mass, weight, amount, etc.) of fluid is discharged to mixer drum 102. In some embodiments, controller 302 operates pump 210 to discharge fluid from tank 228 to mixer drum 102 until:

$$V_{add}(t) = V_{desired}$$

is true, where V add (t) is the cumulative volume of fluid that has passed through meter 214 (and has been discharged to mixer drum 102) since an initial time $t_0$, and $V_{desired}$ is a desired amount of fluid to be discharged into mixer drum 102. It should be understood that controller 302 may operate pump 210 similarly based on a cumulative amount of mass discharged to mixer drum 102 (e.g., using values of mass of fluid discharged to mixer drum 102 as opposed to volumetric values). In some embodiments, controller 302 is configured to receive values of speed, volumetric flow rate, or mass flow rate from meter 214, and controller 302 uses the speed, volumetric flow rate, or mass flow rate received from meter 214 to determine a cumulative amount of fluid added to or discharged into mixer drum 102 since the initial time $t_0$ (e.g., a time at which pump 210 initially begins operation to discharge fluid into mixer drum 102).

Controller 302 may also operate pump 210 to account for the fluid present in the various lines, conduits, pipes, tubular members, etc., of additive admixture system 200. For example, controller 302 may operate pump 210 until:

$$V_{add}(t) + V_{additional} = V_{desired}$$

is true, where $V_{add}$ (t) is the cumulative volume of fluid that has passed through meter 214 since the initial time $t_0$ when operation of pump 210 to discharge fluid was begun, $V_{additional}$ is an additional amount that accounts for fluid in additive admixture system 200 between meter 214 and check valve 212 or between meter 214 and pump 210, and $V_{desired}$ is the desired amount of fluid to be discharged into mixer drum 102. In this way, controller 302 may operate pump 210 to discharge an amount of fluid into mixer drum 102 while accounting for fluid that may stagnate in additive admixture system 200.

After the desired amount of fluid is discharged by pump 210 into mixer drum 102, controller 302 may cease operation of pump 210. In some embodiments, controller 302 once the desired amount of fluid is discharged by pump 210 into mixer drum 102, controller 302 maintains valve 204 in the open position and opens air inlet valve 208 so that fluid present in additive admixture system 200 upstream of check valve 212 may flow back through additive admixture system 200 (e.g., through intermediate line 238, pump 210, and first inlet line 202) to tank 228. Controller 302 may maintain valve 204 and air inlet valve 208 in the open positions/states while maintaining air valve 206 in the closed state so that fluid back-flows through the pipes, conduits, tubular members, etc., of additive admixture system 200 that are upstream of check valve 212 to tank 228. In some embodiments, controller 302 concurrently or simultaneously de-activates or ceases operation of pump 210 while opening air valve 206 so that the tubular members of additive admixture system 200 upstream of check valve 212 are de-pressurized and so that the fluid may return, drain, or fall back into tank 228. In some embodiments, tank 228 is positioned lower on concrete mixer truck 10 so that fluid may tend to drain into tank 228 when air valve 206 is closed, valve 204 is open, and air inlet valve 208 is open. Controller 302 may maintain air inlet valve 208 and valve 204 in the open position and air valve 206 in the closed position for a predetermined amount of time so that the fluid drains into tank 228.

After air inlet valve 208 and valve 204 have been maintained in the open position and air valve 206 has been maintained in the closed position for the predetermined amount of time so that the fluid drains back into tank 228, controller 302 may close valve 204 and air inlet valve 208, and open air valve 206. Controller 302 may operate an air pressurization system 400 to blast pressurized air into second inlet line 220. The pressurized air may enter second inlet line 220, pass through the open air valve 206, and force remaining fluid in the various conduits of additive admixture system 200 to exit through outlet line 216. In some embodiments, controller 302 operate air pressurization system 400 to force pressurized air through additive admixture system 200 to clear the tubular members of additive admixture system 200 from second inlet line 220 to outlet opening 218 of outlet line 216. After controller 302 operates air pressurization system 400 to clear the tubular members, controller 302 may operate air valve 206 to transition back into the closed position.

Air pressurization system 400 may be or include a compressed air tank, according to one embodiment. In another embodiment, air pressurization system 400 is or includes an air compressor that may be operated by controller 302 to provide compressed air to second inlet line 220. Air pressurization system 400 may be attached, secured, fixedly coupled, mounted, etc., with frame 12 of concrete mixer truck 10 or other frame or structural members of concrete mixer truck 10. Advantageously, evacuating or clearing additive admixture system 200 using compressed or pressurized air reduces a likelihood that fluid may stagnate in the various tubular members of additive admixture system 200. If fluid stagnates in the various tubular members, the stagnant fluid may freeze which may adversely affect the tubular members of additive admixture system 200. Additionally, evacuating or clearing additive admixture system 200 using compressed or pressurized air reduces the need for a nozzle at outlet opening 218 of outlet line 216, and facilitates better dispersion of the fluid into mixer drum 102 at outlet opening 218.

In this way, controller 302 may transition additive admixture system 200 between a first mode, or a fluid addition mode, a second mode, or a drain mode, a third mode or a system clear mode, and a fourth mode, or a delivery drain mode, by transitioning valve 204, air valve 206, and air inlet valve 208 between their open and closed positions/states. For example, controller 302 may transition additive admixture system 200 between the modes shown in Table 1 below by transitioning valve 204, air valve 206, and air inlet valve 208 between their open and closed positions:

TABLE 1

Additive Admixture System Modes

| Mode | Valve 204 | Air Valve 206 | Air Inlet Valve 208 |
|---|---|---|---|
| Fluid/Additive Addition | Open | Closed | Closed |
| Drain | Open | Closed | Open |
| System Clear | Closed | Open | Closed |
| Delivery Drain | Closed | Closed | Open |

The system clear mode may be used to both clear additive from additive admixture system 200 (e.g., to clear outlet line 216, clear outlet opening 218, etc.) after operating in the fluid/additive addition mode or after operating in the drain mode (e.g., after additive is added), and also before operating in the fluid/additive addition mode to facilitate ensuring that intermediate line 238, outlet line 216, and outlet opening 218 are cleared of cement, concrete, mixture, slurry material, material, etc., that may accumulate in additive admixture system 200 so that additive can be properly added. In one embodiment, additive admixture system 200 is transitioned into the system clear mode in response to receiving a user input (e.g., via a user interface, a human machine interface, a user input device, etc., that is communicably coupled with controller 302) to clear additive admixture system 200 of any residual additive that is still present in intermediate line 238, outlet line 216, or outlet opening 218 after additive is added, or to clear additive admixture system 200 of any cement, concrete, mixture, material, debris, etc., that may clog in outlet line 216 or outlet opening 218.

The delivery drain mode includes operating or maintaining valve 204 in the closed position, operating or maintaining air valve 206 in the closed position, and operating or maintaining air inlet valve 208 in the open position. The delivery drain mode can facilitate improved operation of additive admixture system 200 to reduce variation in back-pressure which may cause inaccuracies.

In another embodiment, additive admixture system 200 is automatically or periodically transitioned into the system clear mode (e.g., by controller 302). Additive admixture system 200 may transition into the system clear mode prior to transitioning into the fluid/additive addition mode. For example, additive admixture system 200 may transition into the system clear mode prior to adding additive to mixer drum 102. Controller 302 transition additive admixture system 200 into the system clear mode so that air pressurizations system 400 blasts air through second inlet line 220, air valve 206, intermediate line 238, pump 210, outlet line 216, and outlet opening 218 to clear any clogged material, debris, etc., from outlet line 216 and outlet opening 218. Advantageously, transitioning additive admixture system 200 ensures that any clogged debris, material, mixture, etc., is forced out of outlet line 216 and so that outlet opening 218 is cleared.

Additive admixture system 200 can be transitioned into the system clear mode at periodic or scheduled time intervals by controller 302. In other embodiments, additive admixture system 200 can be transitioned into the system clear mode before additive is added to mixer drum 102 to ensure that outlet line 216 and outlet opening 218 are cleared of any clogged debris (by blasting air through outlet line 216 and outlet opening 218 through operation of air pressurization system 400).

In some embodiments, operating additive admixture system 200 in the system clear mode facilitates or drives or results in movement or motion of outlet line 216. For example, the outlet opening 218 and outlet line 216 may move as air is blasted through outlet line 216 and outlet opening 218 to clear outlet line 216 and outlet opening 218 of any clogged material. Movement of outlet line 216 may facilitate clearing any clogged material, cement, concrete, mixture, etc., that is present in outlet line 216, or may facilitate directing ejected or discharged clogged material to a desired location (e.g., outside of mixer drum 102).

Additive admixture system 200 can be transitioned into the system clear mode to clear clogged material in addition to or in combination with transitioning into the system clear mode to clear stagnant additive from outlet line 216 and outlet opening 218. For example, one embodiment of additive admixture system 200 transitions into the system clear mode only to clear additive from additive admixture system 200, while another embodiment of additive admixture system 200 only transitions into the system clear mode to clear clogged mixture from additive admixture system 200, while still another embodiment of additive admixture system 200 transitions into the system clear mode to both clear clogged material prior to adding additive or after adding the additive to clear any stagnant additive from additive admixture system 200.

Additive admixture system 200 can be transitioned between the fluid/additive addition mode, the drain mode, the system clear mode, and the delivery drain mode subsequently or based on current conditions at additive admixture system 200. For example, additive admixture system 200 may initially operate in the fluid/additive addition mode, then transition into the delivery drain mode (e.g., for a predetermined amount of time), then transition into the drain mode (e.g., for a predetermined amount of time), and then transition into the system clear mode (e.g., for a predetermined amount of time).

Additive admixture system 200 can be configured to adjust its operation for different types of fluids or different additives. In some embodiments, additive admixture system 200 is configured to account for different viscosities of fluids or different additives. Additive admixture system 200 can include a pressure sensor 246 configured to measure a pressure of fluid or additive in additive admixture system 200 and a temperature sensor 248 configured to measure a temperature of fluid or additive in additive admixture system 200. Pressure sensor 246 can be positioned upstream of pump 210 (e.g., on a suction side of pump 210) so that pressure sensor 246 measures vacuum or suction pressure. In other embodiments, pressure sensor 246 is positioned downstream of pump 210 so that pressure sensor 246 measured discharge pressure. Likewise, temperature sensor 248 can be positioned upstream of pump 210 or downstream of pump 210.

Pressure sensor 246 and temperature sensor 248 can be configured to provide controller 302 with measured pressure and measured temperature of the fluid or additive of additive admixture system 200. Controller 302 may use the measured pressure and the measured temperature of the fluid or additive to determine a viscosity of the fluid or additive and therefore to determine what material is present in additive admixture system 200. Controller 302 can adjust an operation of pump 210 based on the viscosity of the material or additive. Advantageously, using controller 302 to determine the viscosity of the material or additive can reduce or eliminate a need for an operator to interact with additive admixture system 200 and may facilitate using multiple different liquid admixtures (with corresponding adjustments to additive admixture system 200).

Referring particularly to FIGS. 6-8, 10, and 11, one or more components or devices of additive admixture system 200 may be positioned within a housing 226. Housing 226 may contain valve 204, air valve 206, air inlet valve 208, intermediate line 238, pump 210, check valve 212, and meter 214 therewithin. Housing 226 can be mounted or fixedly coupled at hopper 110 of concrete mixer truck 10. Housing 226 may include a first opening 229 at a first end through which first inlet line 202 and second inlet line 220 extend. Housing 226 also includes a second opening 230 at a second or opposite end of housing 226 through which outlet line 216 extends. Controller 302 can also be positioned within housing 226. Housing 226 facilitates protection of the various components of additive admixture system 200.

Referring particularly to FIGS. 15-19, tank 228 is shown in greater detail, according to an exemplary embodiment. Tank 228 may include an attachment portion 236 that is fixedly coupled with frame 12 or another structural member of concrete mixer truck 10. Tank 228 can include a body portion 232 including an inner volume configured to store the fluid or additive for additive admixture system 200. First inlet line 202 may fluidly couple with body portion 232 of tank 228 so that fluid or additive stored in tank 228 can be discharged to mixer drum 102 through additive admixture system 200. Tank 228 can also include a fluid outlet 241 that may be opened by a technician to drain tank 228. Tank 228 may also include a fill cap 250 that may be removably coupled with body portion 232. Fill cap 250 may be removed to expose an opening, an inlet, an aperture, etc., in body portion 232 so that body portion 232 may be filled with additive or fluid.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, by way of example, instructions and data which cause a general purpose computer, special purpose computer, or special purpose processing machines to perform a certain function or group of functions.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A concrete mixer vehicle comprising:
    a mixer drum comprising an inner volume configured to hold a mixture for transportation and placement;
    an additive admixture system comprising:
        an air inlet valve;
        a fluid valve;
        an air valve; and
        a pump;
        wherein an outlet of the fluid valve is fluidly coupled with an intermediate tubular member;
        wherein an outlet of the air valve is fluidly coupled with the intermediate tubular member at a position upstream of an inlet of the pump, the air valve configured to receive compressed air from a compressed air system;
        wherein the air inlet valve is fluidly coupled with the intermediate tubular member and atmospheric pressure; and
        wherein an outlet of the intermediate tubular member is fluidly coupled with the inlet of the pump; and
    a controller configured to operate the air inlet valve, the fluid valve, the air valve, and the pump of the additive admixture system to transition the additive admixture system between an additive addition mode, a drain mode, and a system clear mode.

2. The concrete mixer vehicle of claim 1, wherein the additive admixture system further comprises:
    a first inlet line fluidly coupled with the fluid valve and a tank configured to store an additive;
    a second inlet line fluidly coupled with the air valve and the compressed air system configured to provide compressed air to the additive admixture system when the air valve is opened;
    a check valve positioned downstream of the pump; and
    a flow meter positioned downstream of the pump.

3. The concrete mixer vehicle of claim 2, wherein the flow meter is configured to measure any of:
    an amount of the additive discharged by the pump;
    a speed of the additive discharged by the pump;
    a volumetric flow rate of the additive discharged by the pump; or
    a mass flow rate of the additive discharged by the pump.

4. The concrete mixer vehicle of claim 1, wherein the controller is configured to:
    transition the additive admixture system into the additive addition mode and operate the pump until a desired amount of an additive is added to the mixer drum;
    transition the additive admixture system into the drain mode for a first predetermined amount of time in response to the desired amount of additive being added to the mixer drum; and
    transition the additive admixture system into the system clear mode for a second predetermined amount of time to clear stagnant fluid or built up mixture from the additive admixture system.

5. The concrete mixer vehicle of claim 1, wherein transitioning the additive admixture system into the additive addition mode comprises:
    transitioning the fluid valve into an open position;
    transitioning the air valve into a closed position; and
    transitioning the air inlet valve into a closed position.

6. The concrete mixer vehicle of claim 1, wherein transitioning the additive admixture system into the drain mode comprises:
    transitioning the air inlet valve into an open position.

7. The concrete mixer vehicle of claim 1, wherein transitioning the additive admixture system into the system clear mode comprises:
    transitioning the fluid valve into a closed position; and
    transitioning the air valve into an open position.

8. The concrete mixer vehicle of claim 1, wherein fluid in the additive admixture system that is upstream of a check valve drains into a tank of the additive admixture system and fluid in the additive admixture system that is downstream of the check valve drains into the mixer drum, when the additive admixture system is in the drain mode.

9. An additive admixture system for a mixer drum, comprising:
    an air inlet valve fluidly coupled with an intermediate tubular member and configured to receive compressed air from a compressed air system;
    a fluid valve;
    an air valve;
    a pump fluidly coupled with an additive tank through the intermediate tubular member, the pump fluidly coupled with the intermediate tubular member at a location downstream of a fluid coupling point of the air inlet valve, wherein an outlet of the air valve is fluidly coupled with the intermediate tubular member at a position upstream of an inlet of the pump; and
    a controller configured to operate the air inlet valve, the fluid valve, the air valve, and the pump of the additive admixture system to transition the additive admixture system between an additive addition mode, a drain mode, and a system clear mode, wherein the controller is configured to:
- transition the additive admixture system into the additive addition mode and operate the pump until a desired amount of an additive is added to the mixer drum;
- transition the additive admixture system into the drain mode for a first predetermined amount of time in response to the desired amount of additive being added to the mixer drum; and
- transition the additive admixture system into the system clear mode for a second predetermined amount of time to clear stagnant fluid or built up mixture from the additive admixture system.

10. The additive admixture system of claim 9, wherein the additive admixture system further comprises:
- a first inlet line fluidly coupled with the fluid valve and a tank configured to store the additive;
- a second inlet line fluidly coupled with the air valve and the compressed air system configured to provide compressed air to the additive admixture system when the air valve is opened;
- a check valve positioned downstream of the pump; and
- a flow meter positioned downstream of the pump.

11. The additive admixture system of claim 10, wherein the flow meter is configured to measure any of:
- an amount of the additive discharged by the pump;
- a speed of the additive discharged by the pump;
- a volumetric flow rate of the additive discharged by the pump; or
- a mass flow rate of the additive discharged by the pump.

12. The additive admixture system of claim 10, wherein:
- an outlet of the fluid valve is fluidly coupled with the intermediate tubular member;
- the air inlet valve is fluidly coupled with atmospheric pressure; and an outlet of the intermediate tubular member is fluidly coupled with the inlet of the pump.

13. The additive admixture system of claim 9, wherein transitioning the additive admixture system into the additive addition mode comprises:
- transitioning the fluid valve into an open position;
- transitioning the air valve into a closed position; and
- transitioning the air inlet valve into a closed position.

14. The additive admixture system of claim 9, wherein transitioning the additive admixture system into the drain mode comprises:
- transitioning the air inlet valve into an open position.

15. The additive admixture system of claim 9, wherein transitioning the additive admixture system into the system clear mode comprises:
- transitioning the fluid valve into a closed position; and
- transitioning the air valve into an open position.

16. The additive admixture system of claim 9, wherein fluid in the additive admixture system that is upstream of a check valve drains into a tank of the additive admixture system and fluid in the additive admixture system that is downstream of the check valve drains into the mixer drum, when the additive admixture system is in the drain mode.

17. A concrete mixer vehicle comprising:
- a mixer drum comprising an inner volume configured to hold a mixture for transportation and placement;
- an additive admixture system comprising a fluid valve, an air valve, an air inlet valve configured to vent to atmospheric pressure when opened, and a pump configured to receive admixture through an inlet from the fluid valve, the air valve configured to fluidly couple with an air pressurization system and to fluidly couple with the pump at a position upstream of the inlet of the pump to provide pressurized air upstream of the pump; and
- a controller configured to operate the fluid valve, the air valve, the air inlet valve, and the pump of the additive admixture system to transition the additive admixture system between an additive addition mode, a drain mode, and a system clear mode, wherein the controller is configured to:
  - transition the additive admixture system into the additive addition mode and operate the pump to add an additive to the mixer drum;
  - transition the additive admixture system into the drain mode in response to the additive being added to the mixer drum; and
  - transition the additive admixture system into the system clear mode to clear stagnant fluid from the additive admixture system.

18. The concrete mixer vehicle of claim 17, wherein transitioning the additive admixture system into the additive addition mode comprises:
- transitioning the fluid valve into an open position;
- transitioning the air valve into a closed position; and
- transitioning the air inlet valve into a closed position.

19. The concrete mixer vehicle of claim 17, wherein transitioning the additive admixture system into the drain mode comprises:
- transitioning the air inlet valve into an open position.

20. The concrete mixer vehicle of claim 17, wherein transitioning the additive admixture system into the system clear mode comprises:
- transitioning the fluid valve into a closed position; and
- transitioning the air valve into an open position.

* * * * *